United States Patent [19]
Turner et al.

[11] Patent Number: 6,018,524
[45] Date of Patent: Jan. 25, 2000

[54] SCALABLE HIGH SPEED IP ROUTING LOOKUPS

[75] Inventors: Jonathan Turner; George Varghese, both of St. Louis, Mo.; Marcel Waldvogel, Winterthur, Switzerland

[73] Assignee: Washington University, St. Louis, Mo.

[21] Appl. No.: 08/926,370

[22] Filed: Sep. 9, 1997

[51] Int. Cl.⁷ .................................................. H04L 12/28
[52] U.S. Cl. ................................. 370/392; 707/2; 707/7
[58] Field of Search .................................... 370/312, 352, 370/355, 356, 389, 395, 432, 472; 709/238, 242; 707/2, 7; 371/67.1

[56] References Cited

U.S. PATENT DOCUMENTS

| | | | |
|---|---|---|---|
| 3,701,111 | 10/1972 | Cocke et al. .......................... | 340/172.5 |
| 4,464,650 | 8/1984 | Eastman et al. ................. | 340/347 DD |
| 5,440,546 | 8/1995 | Bianchini, Jr. et al. ................ | 370/413 |
| 5,613,069 | 3/1997 | Walker ..................................... | 370/355 |
| 5,651,002 | 7/1997 | Van Seters et al. ..................... | 370/392 |
| 5,781,772 | 7/1998 | Wilkinson, III et al. ............... | 370/229 |

OTHER PUBLICATIONS

De Berg, Van Krevold and Snoeyink, Two–and Three–dimensional Point Location in Rectangular Subdivisons, Journal of Algorithms, vol. 18, 1995; pp. 256 through 265.

*Primary Examiner*—Hassan Kizou
*Assistant Examiner*—Daniel Previl
*Attorney, Agent, or Firm*—Howell & Haferkamp, L.C.

[57] ABSTRACT

A method and apparatus for an exponentially faster technique than is presently utilized in routers for looking-up destination addresses and matching them to a prefix in order to determine an output data link for routing of the data message to a destination. The basic algorithm includes arranging the prefix and corresponding output data link information in sub-databases arranged by prefix length and then using a multi-step prefix length binary search algorithm to sort through the sub-databases to determine a best matching prefix for routing of the data packet. Various refinements of the basic algorithm are disclosed to further enhance the search time including adding markers representative of sub-database entries having a longer prefix length and also various searching methodologies to minimize the number of searching steps including rope searching in various formats. Thus, methodologies are disclosed for building the sub-databases, as appropriate to implement the corresponding novel search routines and perform the novel search routines themselves, and the router which implements all of the foregoing. Many of the inventive features disclosed herein are applicable to other routing DPJ protocols such as OSI Routing, call routing and telephone DPJ networks, and string matching problems.

16 Claims, 12 Drawing Sheets

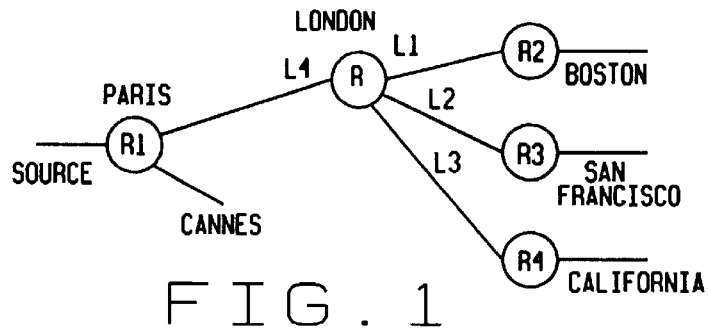
FIG. 1
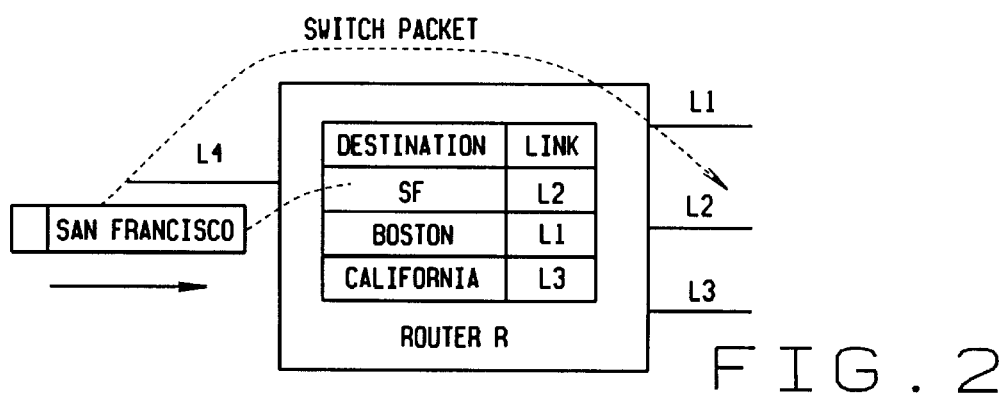
FIG. 2
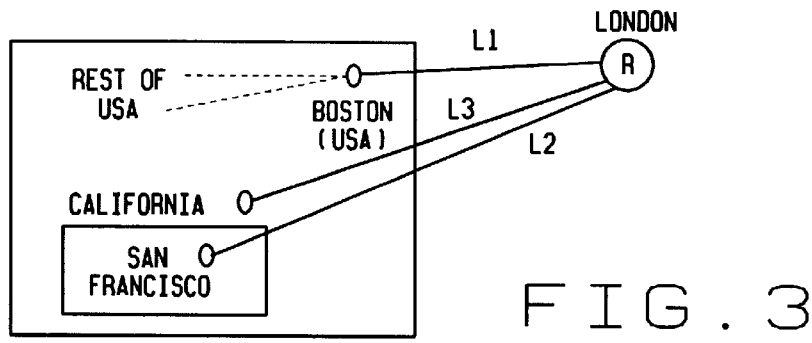
FIG. 3
| DESTINATION | LINK |
|---|---|
| USA.CA.SF | L2 |
| USA | L1 |
| USA.CA | L3 |
| USA.MA.BOSTON | L2 |
FIG. 4
P1 = 10*
P2 = 111*
P3 = 11001*
P4 = 1*
P5 = 0*
P6 = 1000*
P7 = 100000*
P8 = 1000000*
FIG. 5

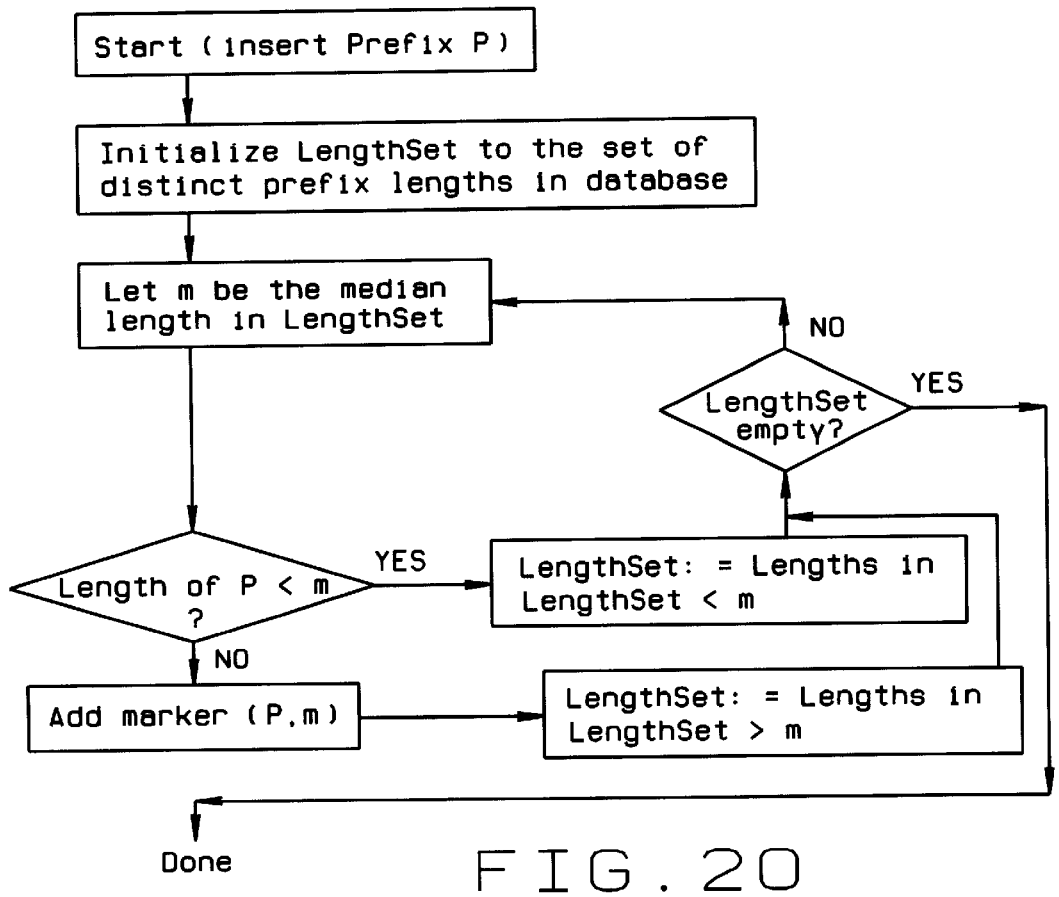

FIG. 20

```
Function RopeSearch (D) (*search for address D*)
Rope: = StartRope; (*start with default rope*)
BMP: = nil; (*initialize best prefix so far to nil*)
While Rope not empty do
    Let l be first element in Rope
    Let Dl be the prefix corresponding to first l bits of D;
    X: = Search (HashTable [l], Dl); (*search hash table for Dl*)
    If X ≠ nil then
        BMP: = X.bmp; (*update best matching prefix so far*)
        Rope: = X.Rope; (*get the new Rope, possibly empty*)
    Else Rope = Rope-1 (*strip first element from Rope*)
    Endif
Endwhile
Return (BMP);
```

FIG. 22

```
Function MakeRope (Length, d)
(* Length is an array in which Length[i] contains the i-th largest*)
(* prefix length in the set of prefix lengths and Length[0] is the*)
(* number of distinct prefix lengths*)
Rope = nil;
m = [(Length[0]/2)]
while j ≠ 0 do
    Add Length[i] to end of Rope;
    if j = 1 then j: = 0 else j: = [(d/2)]
endwhile
Return (Rope);
```

P1 = 10*
P2 = 111*
P3 = 11001*
P4 = 1*
P5 = 0*

```
Function RecursiveHashBuild (RopeStorage, PrefixList, SeedBmp)
(*build data structure for prefixes in PrefixList and store Rope in RopeStorage*)
S: = ComputePrefixLengths (PrefixList); (*find set of distinct prefix lengths*)
RopeStorage.Rope: = MakeRope (S); (*store rope out of length set*)
If S is empty then Return; (*return early if PrefixList is empty*)
Let m be first element of RopeStorage.Rope (*median length*)
(*now partition Prefix List into two Lists based on median length*)
L1: = {P: P ∈ PrefixList and Length (P) <m }
L2: = PrefixList-L1; (*list of prefixes with lengths no less than m *)
RecursiveHashBuild (UpperRope, L1, SeedBmp) (*build hash tables for upper
                                                              half of trie*)
Initialize MarkerList to empty (*will contain list of length m markers*)
For each prefix P in L2 do (*create markers for all prefixes in L2*)
    Let Pm be first m bits of P
    X: = Search (HashTable [m], Pm); (*search hash table m for Pm*)
    If X = nil then
    X.bmp: = RopeSearch (UpperRope.Rope, Pm); (*do rope search to find bmp
                                                              using Upper subtrie's rope*)
       If SeedBmp is longer than X.bmp then X.bmp: = SeedBmp:
       X.value: = Pm:
       Add X to MarkerList (*keep track of all markers*)
    Endif
    If Pm = P then X.bmp: = p (*if marker is a prefix, its the bmp*)
    If Pm ≠ P then (*don't include prefix if equal to marker*)
        Add P to X.PrefixList (*keep track of prefixes for each marker*)
Endfor
(*now recursively build data structure for subtries rooted at each marker*)
For each marker X in MarkerList
    RecursiveHashBuild (X, X.PrefixList, X.bmp) (*build hash table for trie
                                                              rooted at X.value*)
(*notice that the Marker Rope is computed as part of subtrie building*)
```

FIG. 23

```
Function ComputePrefixLengths (PrefixList)
(*assumes Prefix lengths is sorted. Returns Length, where*)
(* Length is an array in which Length[i] contains the i-th largest*)
(*prefix length in the list of prefix lengths and Length[0] is *)
(* the number of distinct prefix lengths*)
Length[0] = 0 (*initialize number of distinct lengths to 0*)
while PrefixList is not empty do
Let p be next prefix in PrefixList
Let i: = L [0]
    If (i = 0) or (Length [i] ≠ Length (p)) then
        Length [i+1]: = Length (p)
        Length [0]: = i+1
endwhile
Return (Rope);
```

FIG. 30

SCALABLE HIGH SPEED IP ROUTING LOOKUPS

CROSS REFERENCE TO RELATED APPLICATION

This application is related to co-pending Ser. No. 08/821,100 filed Mar. 20, 1997.

BACKGROUND OF THE INVENTION

The Internet is becoming ubiquitous: everyone wants to join in. Statistics show that the number of computers on the internet is tripling approximately every two years. Traffic on the Internet is also increasing exponentially. Traffic increase can be traced not only to increased hosts, but also to new applications (e.g., the Web, video conferencing, remote imaging) which have higher bandwidth needs than traditional applications. One can only expect further increases in users, computers, and traffic. The possibility of a global Internet with multiple addresses per user (e.g., each user may have several appliances on the Internet) has necessitated a transition from the older Internet routing protocol (called IPv4, with small 32 bit addresses) to the proposed net generation protocol (called IPv6, with much larger 128 bit addresses).

The increasing traffic demand placed on the network forces two key factors to keep pace; first, the speed of communication links; and second, the rate at which routers (routers are boxes that route messages in the Internet, very much like automated Post Offices in the postal network) can forward messages. With the advent of fiber optic links, it is easily and economically possible to solve the first problem. For example, MCI is currently upgrading its Internet backbone links from 45 Mbits/s to 155 Mbits/s, and they plan to switch to 622 Mbit/s within a year. However, improving the speed of communication links is insufficient unless router forwarding speeds increase proportionately.

Today's fastest routers (built by say CISCO systems) forward messages at a maximum rate of 100,000 to 500,000 messages a second. However, communication link speeds are already reaching speeds of 1 Gigabit/sec (1 Gigabit= 1000 million bits per second). A router has to forward 5 million messages (of average size say 200 bits) per second to keep up with the speed of a Gigabit link. With the popularity of the Internet and the larger traffic volumes expected, every router vendor (CISCO, BAY NETWORKS, etc.) wants to increase the forwarding performance of its routers.

The major problem that routers face in forwarding an Internet message is something known as address lookup. To understand this, we must first have an intuitive idea of what a router does. Consider a hypothetical fragment of the Internet linking users in Europe with users in the United States. Consider a source user (see label called Source in the left of FIG. 1) in Paris. If this user wishes to send say an email message to San Francisco, the user will send its message to a router R1 which is, say, in Paris. The Paris router may send this message on the communication link L4 to router R, say in London. The London Router R may then send the message on line L2 to router R3 in San Francisco; R3 then sends the message to the destination.

Notice how a message travels from source to destination alternating between communication links and routers. This is almost identical to the way a postal letter travels from post office to post office using some communication channel (e.g., an airplane). How does each post office decide where to forward the letter? Each post office does so, using the destination address that is placed on the envelope containing the letter. In the same way, routers must decide to forward a message based on a destination address that is placed in an easily accessible portion of the message called a header.

With this context, we can understand how a router forwards an incoming message. Consider the router R in FIG. 1. We show a schematic description of router R in FIG. 2. When a message arrives on say link L4, the message carries its destination address San Francisco in its message header. Router R is a special computer whose job is to forward all messages that are sent to it towards their final destinations. To do so, router R consults a Forwarding Table (sometimes also called a Forwarding Database). This is a table in the memory of R, which lists each possible destination and the corresponding output link. Please do verify that the Forwarding Table contents are consistent with FIG. 1.

Thus when a message to San Francisco arrives on link L4, router R looks up the destination address San Francisco in its forwarding table. Since the table says L2, the router then switches the entire message to the output link L2. It then proceeds to service the next arriving message. Notice that so far the word "lookup" is no different from looking up a word in a dictionary or a phone number in the phone book. We will show it is a lot harder than dictionary or phone book lookup shortly.

Thus the two main functions of a router are to lookup destination address (address lookup) and then to send the packet to the right output link (message switching) To be more precise, there are some additional chores such as incrementing a visit count in a message; but these chores are fairly trivial compared to lookup and switching. Both must be done at very high speeds. Fortunately, the problem of message switching is very well understood in recent years because of advances in ATM Switching Technology. Economical gigabit message switching is quite feasible today because of the work of co-inventors Jon Turner and others. (Thus one can imagine a router as having an ATM core to switch packets.)

We have already seen that of the two main functions of a router, message switching is a solved problem and already available in many commercial products. Despite this, the problem of doing address lookups at Gigabit speeds remains. Current vendor speeds for lookups are quite slow. For example, Ascend's product has hardware assistance for lookups and can take up to 3 $\mu$s for a single lookup in the worst case and 1 $\mu$s on average. Our invention, on the other hand, gives ten times faster address lookup performance (lookups in around 0.1 $\mu$s).

Before we describe how our invention works, it is important to understand why Internet address lookup is hard. It is hard for two reasons. First, Internet addresses are not specially created (like ATM addresses) to be easy to lookup. Second, the Internet deals with scaling issues by using address prefixes which requires a more complex lookup. We describe details below.

First, looking up Internet addresses is a lot harder than say looking up ATM addresses. ATM addresses (VCs) are carefully chosen to be simple to lookup in switch tables. Unfortunately, ATM addresses must be set up for each conversation which adds delay; by contrast, Internet addresses (like postal addresses) are relatively fixed and there is no additional set up delay per conversation. Secondly, ATM addresses do not currently make much provision for hierarchical networks and so are perceived not to be scalable to truly global networks. IP, through the use of prefixes (see below), has provision for scaling. Thus for various reasons, some technical and some political, the Internet and ATM seem to be each going their own way. In the future, they are likely to coexist with ATM backbones and ATM LANs IN THE Internet. IP address lookup is a lot harder and ii) the Internet is unlikely, if at all, to change completely to ATM.

The second thing to realize is that the Internet lookup problem is a lot harder than looking up a phone number in a phone book, or a word in a dictionary. In those problems, we can search quite fast by first sorting all the words or names. Once sorted, if we are looking for a word starting with Sea, we simply go to the pages of S entries and then look for words starting with Sea etc. Clearly, such lookup is a lot faster than looking up all entries in a dictionary. In fact, such lookup is called exact matching lookup; standard solutions based on hashing and binary search provide very fast times for exact matching.

The Internet lookup problem is a lot harder than dictionary search because Internet routers store address prefixes in their forwarding tables to reduce the size of their tables. However, the use of such address prefixes makes the lookup problem one of longest matching prefix instead of exact matching. The longest matching prefix problem is a lot harder. Before we explain why, let us digress briefly and explain why routers store prefixes in their tables.

Consider FIG. 3. The situation is similar to that in FIG. 1. However, we show the geographic significance of the addresses more clearly. Router R has link L1 to get to Boston as before, but Boston is also the "hub" for the whole of the U.S. Assume that we can get to any destination in the U.S. from a hub router in Boston. As before line L3 leads to California. from where a message can be sent directly to any location in California. Finally, as before, link L2 leads directly to San Francisco.

If we were to use the naive database in FIG. 2, we would have to list every destination in the U.S. (possibly thousands) in the database. For example, we might list Denver, Kans., and other cities as being reachable through Boston on link L1 . This would lead to an enormously large table in router R, which would be difficult to store and maintain.

Instead, we prefer to store prefixes in the modified database of FIG. 4. Notice that we now store all the destinations such as Denver, Kans. by the single entry USA.*(anything in the USA). We store California as USA.CA.* (anything California), and San Francisco as USA.CA.SF. Thus we have used only three entries to store the same amount of information. Of course, to make this work we have to modify the destination address in a message from say SanFrancisco (see FIG. 2) to say USA.CA.SF. But this is easily done.

The use of prefixes introduces a new dimension to the lookup problem: multiple prefixes may match a given address. If a packet matches multiple prefixes, it is intuitive that the packet should be forwarded corresponding to the most specific prefixes or longest prefix match. Thus a packet address to USA.CA.SF matches the USA*, USA.CA.*, and the USA.CA.SF entries. Intuitively, it should be sent to L2 corresponding to the most specific match USA.CA.SF. This is because (see FIG. 3) we have a direct line to San Francisco and want to use it in place of possibly longer routing through Boston. Similarly a packet addressed to USA.CA.LA matches the USA* and USA.CA.* entries. Intuitively, it should be sent to L3 corresponding to the most specific match USA.CA.*.

In summary, routers obtain massive savings in table size by summarizing several address entries by using a single prefix entry. Unfortunately, this leads to possibly multiple prefixes matching a given address, with the result that routers must solve a harder problem called best matching prefix.

With this interlude behind us, we can define the Internet address lookup problem. First, Internet addresses are strings of bits, not words using English characters, as we used above for the sake of illustration. A bit is either a 0 or 1. A bit string is a sequence of bits like 0101. The length of a bit string is the number of bits it contains. Thus the length of bit string 0101 is 4. Internet addresses come in two flavors. The current Internet (sometimes called IPv4, for Internet Protocol, version 4) uses addresses that are bit strings of length 32. We often say that IPv4 uses 32 bit addresses. The Internet is expected to evolve to a next generation Internet (sometimes called IPv6, for Internet Protocol, version 6) which uses 128 bit addresses. As we will see, the longer length of IPv6 addresses will only compound the problems of routers.

Except for this minor difference (bit strings instead of character strings), the Internet lookup problem is exactly the best matching prefix problem described above. To make things more concrete, consider the forwarding table of Internet address prefixes shown in FIG. 5. We will use this table, with minor variations, for all the examples herein.

Except for the fact that we use bit strings (and we have labeled the prefixes for convenience), the situation is identical to the table in FIG. 4.

Now suppose we have a 32 bit IPv4 destination address whose first 6 bits are 10101. Clearly its best matching prefix is Prefix P4 though it also matches Prefix P3 and P2. Thus any message to such a destination address should be sent to the output link corresponding to P4, which is L2.

The naivest method to solve the best matching prefix problem is to scan the entire forwarding table looking for the best matching prefix of an address. This would be grossly inefficient for large tables.

We now describe two standard solutions that attempt to solve the IP matching prefix. The first solution is based on converting the best matching prefix problem into an exact match problem. The second solution is based on using a data structure called a trie. We will see that both solutions examine a destination address one bit at a time, and hence can take up to 32 steps for IPv4 (and 128 for IPv6). This can be too slow.

From now, we will describe all schemes with respect to IPv4 (32 bit) addresses unless we specifically generalize to include IPv6.

In this idea we divide the forwarding table into several (at most 32) separate forwarding table such that Table i contains all prefixes of length i. Thus, if we redraw the forwarding table of FIG. 5 using this idea, we get FIG. 6. Notice that prefix 1* is in the Length 1 table, Prefix 10* is in the Length 2 table, and so on. We have simply separated prefixes into separate tables according to prefix length.

The idea now is to start trying to find the longest prefix possible starting with the longest length prefix table and work backwards until we find a prefix table that we get a match on. So consider an address A whose first 8 bits are 11000000. Since our longest prefix length is 7, we first try for a 7 bit match. We take the first 7 bits of address A (i.e., 1100000) and use any technique for exact matching to match these first 7 bits of address A against any prefix in the Length 7 database. A good technique to use for this is hashing. Since we fail to find a match, we move to the next length table (Length 6). This time we take the first 6 bits of address A (i.e., 110000) and we search the Length 6 Table (see FIG. 6. Since we failed to find a match we try again with the first 5 bits of A in the length 5 table, then the first bit of A (i.e., 1) and we get a match with prefix P4. Notice that we have tried all possible length tables in the database before we got a match.

On the other hand, if we were to search for an address B whose first 8 bits were 10000011, we would try the length 7 table and fail, but when we try the first six bits, we will find a match in the length 6 database with P6. This time we only searched 2 tables. However, while the best case can involve searching only a few tables, the worst case can involve searching all possible prefix lengths. If we use W bit addresses, this can take W table searches, where W is 32 for IPv4 and 128 for IPv6. Each search through a table requires what we call an exact match (unlike finding the best matching prefix).

This method can cost up to 32 exact matches (often done using hashing in software) for IPv4 and 128 exact matches for IPv6. (To see this consider an address that matches a 1 bit prefix, in a table that contains prefixes of all possible lengths.) An example of a patent that does this is U.S. Pat. No. 5,493,564 by Mullan. This is often too time consuming in software. A Bellcore patent proposes doing all the exact matches in parallel using hardware. Each exact match is done using a Context Addressable Memory (CAM). Unfortunately, the hardware cost of this solution is also formidable as we have to use 32 CAMs for IPv4 (128 for v6); each CAM is expensive. Other methods have proposed pipelining the CAMs instead of doing the searches in parallel.

We will describe a considerable improvement of this scheme that improves the worst case time from W to $\log_2 W$.

A trie is a data structure which allows us to search for prefixes a bit at a time and to do so incrementally. A trie is a tree of nodes, each node containing a table of pointers. The standard solutions for IPv4 (e.g., the solution used in BSD UNIX) uses binary tries, in which each trie node is a table consisting of two pointers.

An example will explain how tries work. Consider FIG. 7. The root node is shown on the top left. Each trie node is a table whose topmost entry can contain a prefix. Each table also can contain two pointers, each of which points to other trie nodes (FIG. 7) or to prefixes. This trie stores the same table as FIG. 5. The root node (topmost node) has two pointers. The first pointer, corresponding to the value '0', points to a subtrie that contains all prefixes that start with '0'. Since there is only one such prefix, i.e., P5, the '0' pointer points directly to P5. On the other hand, all other prefixes begin with '1'. Thus the '1' pointer in the root node, points to a subtrie that contains the remaining prefixes.

Each subtrie is a smaller trie with a smaller number of prefixes. In addition to pointers, each node may also have a stored prefix P. Define the path of a trie node N to be the sequence of bits corresponding to the pointers used to reach N starting from the root. Thus in FIG. 7, the path of the trie node containing P4 is 1 and the path of the trie node containing P1 is 10. We store a prefix P inside node N if the path of node N is equal to prefix P, ignoring the * character. Thus in FIG. 7, we see that the node that stores P1 (which is equal to 10*) is indeed 10.

If there is at most one pointer at a node and there are no prefixes stored, then we can collapse a general trie node into a simpler primitive node that only contains a bit and a pointer. For example, the path to prefix P3=11001 (stored at bottom left of FIG. 7) starts at the root and follows the 1 pointer (first bit of P3); then goes to the node containing P4 and follows the 1 pointer (second bit of P3); at the next node the path follows the 0 pointer (third bit of P3). After this there are no other prefixes that share the same path with P3 and thus we have 2 primitive nodes corresponding to the fourth and fifth bits of P3 (0 and 1 respectively) which finally lead to P3.

Thus the bits in a prefix can be used to trace a path through the trie that leads to the prefix by itself (e.g., P3) or to a node that stores the prefix (e.g., P4).

Now consider searching the trie table for the best matching prefix corresponding to an address A whose first 8 bits are 11000000. We use the bits of an address, starting with the leftmost bit, to follow a path through the trie. We always begin at the root node. Since the first bit of A is 1, we follow the '1' pointer. Since the node contains a prefix, P4, we remember this as a possible matching prefix. Then, since the second bit of A is 0, we follow the '0' pointer. We then keep following the path of P3 (because the first four bits are A are the same as that of P3). But when we try the fifth bit of A we find a 0 instead of a 1 and the search fails. At this point, the search terminates with the best matching prefix equal to P4.

On the other hand, if we are searching for the best matching prefix of address B whose first 8 bits are 10010000, the 1 pointer at the root will lead us to P4's node (and we remember P4 as the longest prefix seen so far). Then 0 pointer will lead us to P1's node (and we now remember P1 as the longest prefix seen so far). The 0 pointer (corresponding to 3rd bit of B) at P1's node will lead us to primitive node containing a 0. But at this point we fail because the fourth bit of the address is a 1 and not a 0. Thus the best matching prefix corresponding to address B is P1.

Thus, to find a best match prefix in a trie, we use successive bits of the address to trace a path through the trie, starting from the root, until we fail to find a pointer or we end at a prefix. As we walk through the trie, we remember the last prefix we saw at a previous node, if any. When we fail to find a pointer, this is the best matching prefix.

The worst case time to walk through a trie path is the maximum number of nodes in a trie path. In the example of FIG. 7, the path to P8 requires following 7 pointers. In general if we have the prefixes 1*, 11*, 111*, 1111*, etc. then we can easily have a trie path equal to the maximum address length (32 for IPv4, 128 for IPv6). Thus the time for trie search of an address can be as bad as following 32 (or 128 for v6) pointers. This is somewhat better than the 32 exact matches required in FIG. 6, but it is still slow for real routers. The problem is that the following of each pointer requires at least one READ of memory. The fastest reads to reasonably inexpensive memory takes about 0.06 $\mu$sec.

Thus 32 READs takes about 1.8 $\mu$sec, which is the fastest that trie search can do today.

A description of Tries can be found in the textbook called "Fundamental Algorithms, Sorting and Searching, by Donald Knuth, Addison Wesley, 1973". A description of a particular kind of trie (called a Patricia trie, and which is optimized to reduce storage) applied to Internet lookups can be found in Keith Sklower, A tree-based routing table for berkeley unix, Technical report, University of California, Berkeley and in W. Richard Stevens and Gary R. Wright, *TCP/IP Illustrated, Volume 2 The Implementation*, Addison-Wesley, 1995. H. Wilkinson, G. Varghese and N. Poole, Compressed Prefix Matching Database Searching, U.S. patent application 07/378,718 December 89, Issued in Australia as Patent 620994 describes another variant of tries that reduces storage using a technique called path compression. All the existing trie schemes assume that trie search must be performed 1 bit at a time if the prefixes can be of arbitrary length. This greatly slows down trie search as it requires W memory READs, where W is the size of a destination address.

Trie search that searches multiple bits at a time is described in Tong-Bi Pei and Charles Zukowski, Putting routing tables in silicon, *IEEE Network Magazine*, January 1992. However, this work only applies to exact matching and not to prefix matching.

The work in U.S. Pat. No. 5,414,704 by Spinney applies only to exact matching and not to prefix matching. Radia Perlman, *Interconnections, Bridges and Routers*, Addison-Wesley, 1992 describes a method based on binary search on all prefixes. Unfortunately binary search takes time proportional to the logarithm of the number of entries. For a typical router database of 30,000 entries (growing as the Internet grows) this takes 13 READs to memory which is too slow. The work in U.S. Pat. No. 5,261,090 applies to range checking which is a similar problem but also uses binary search.

SUMMARY OF THE INVENTION

Our basis algorithm replaces the linear searching in the simple hash algorithm described above with an exponentially faster technique similar to standard binary search. In order to make this work we add two major new ideas: first we add marker nodes where necessary to guide the search so that it can halve the search range at each iteration of the search; second, we precompute the best matching prefix of each marker in order to prevent backtracking in case of failure in the binary search.

Rather than present the final solution directly, we will gradually refine these ideas to arrive at a working basic scheme. We describe further optimizations to the basis scheme including rope searching.

Although our scheme uses a completely different search technique, it is easiest to understand our scheme with reference to the naive reduction to exact matching E described above and shown in FIG. 6. Recall that we started by breaking up the database of prefixes into separate tables such that all prefixes of length i are stored in Table i. We then stared with the longest length table and looked for a matching prefix in that table using any exact match method (e.g., hashing). If that failed we moved to the table containing the next greatest length and so on.

The naive algorithm suggests an analogy with a linear search for a data item in an unsorted list of items. One may have to search through all items to find the desired item. Consider FIG. 8 which contrasts linear search to binary search. Suppose we are searching for data item 2 in the table shown on the top of the figure. The best we can do is to start at one end (say the rightmost end) and search each successive item till we find what we are looking for. If the item we are looking for is at the wrong end, we search the whole table. Thus if we are searching for 2, we make 7 probes (i.e., READS to memory) before we find the item.

A better scheme for searching is Binary Search, as shown on the bottom of FIG. 8. We first sort the data items in increasing order. We begin by probing the middle element (i.e., the 4th element in the table which is 5). We check whether what we are looking for (i.e., 2) is greater, less, or equal to the middle element. If equal we are done; if the item we are looking for is greater, then it must be in the right half. If, on the other hand, the item we are looking for is less than the middle element, we now narrow the search to the left half. In our case, since 2 is less than 5, we narrow the search to the left half. We now repeat the process. Since there are only 3 elements in the left half, we probe the middle of the left half (i.e., the 2nd element) which happens to be 3. Once again, since 2 is less than 3, we can narrow the search to the left half of the left half. This consists only of the first element in the table. Our third probe confirms that the first element is 2 and we are done.

In general, binary search takes $\log_2$ n+1 probes to search a sorted table of n data items. Recall that $\log_2$ is the number of times 2 must be multiplied by itself to become equal to n. Thus $\log_2$ 4=2 because 2*2=4 and $\log_2$ 8=3 because 2*2*2= 8. (If n+1 is not a power of 2, $\log_2$ n+1 will not be an integer. In that case, the true number of probes is found by rounding up the answer to the next highest integer.) The crucial point, however, is that $\log_2 n$ (speed of binary search) is much, much smaller than n (speed of linear search).

Binary search in general is very standard and is described in "Fundamental Algorithms, Sorting and Searching, by Donald Knuth, Addison Wesley, 1973".

Our invention begins by considering the naive search algorithm as linear searching and asking whether we can do binary search on the set of distinct prefix lengths in FIG. 6. The main idea is: instead of starting searching in the longest length prefix table, we start at the median length prefix table. The search in the median length table should guide us to either search the left half of the prefix lengths or the right half of the prefix lengths.

Despite this analogy that we use to motivate our scheme, our scheme cannot be dismissed as standard binary search. This will become clearer as we go on but we will outline at this stage why our scheme is novel:

First, the idea of binary searching on prefix lengths has never before been applied to the best matching prefix problem. Radia Perlman, *Interconnections, Bridges and Routers*, Addison-Wesley, 1992 describes a schemes that does binary search on the prefixes, and not on the much small number of prefix lengths as we do; the existing scheme takes $\log_2 n$, where n is the number prefixes, while our scheme takes $\log_2 W$ where W is the number of distinct prefix lengths. Typically N≧30,000 while W=32; thus our binary search scheme is an order of magnitude faster than that of Radia Perlman, *Interconnections, Bridges and Routers*, Addison-Wesley, 1992 where n is the number of prefixes, and is hence much slower than our scheme.)

Second, as we will see, we need to add a great deal of infrastructure (extra markers, precomputed values for markers) to achieve binary searching on prefix lengths. This is because binary searching on prefix lengths is very different from the simple search problem shown in FIG. 8.

Finally, we describe a number of optimizations including a scheme called Rope Search in which the binary search gets progressively more refined as more and more probes succeed.

The resulting scheme goes well beyond simple binary search shown in FIG. 8.

The analogy with binary search inspires us to revisit the scheme described previously with the idea of doing binary search on prefix lengths. To make this clearer, let us return to the database of FIG. 5 as decomposed in FIG. 6. In the naive scheme, we began searching for a match in the Length 7 table. Instead the analogy with binary search inspires us to search in the table corresponding to the median length.

In FIG. 6 and FIG. 5, we have prefixes of all possible lengths from 1 to 7. Thus we have 7 distinct lengths and the median length is 4 (the median is the "middle" element. In the sequence 1, 2, 3, 4, 5, 6, 7 the number 4 is the median as there are 3 elements less and 3 elements greater.) Thus we start our search in the Length 4 table.

Suppose we are searching for the address A whose first eight bits are 11001000. To start with the Length 3 table, we take the first 4 bits of A (i.e., 1100) and search for a match in the Length 4 table in FIG. 6. Unfortunately, we do not find a match because the only entry in this table (see FIG. 6 corresponds to 1000*.

Why is this unfortunate? This is because the best matching prefix of A is P5=11001*, which is in the "right half" of FIG. 6. But if we do not get a match in the Length 4 database we have no information that tells us that there is a matching prefix with length greater than 4. Recall that for binary search to work, we need to obtain information guiding us to move to the "right half" or "left half". (The right half is with respect to FIG. 6.)

For an address like A whose initial bits are 11001000, the best matching prefix is P5 which is in the right half. On the other hand for an address like B whose eight bits are 11100000, the best matching prefix is P2 which is in the left half. But the first four bits of A are 1100 and the first 4 bits of B are 1110. Thus neither A nor B will find a match in the Length 4 table in FIG. 6. But in the case of A, we wish binary search to move to the right; while in the case of B, we wish to move to the left half.

Clearly, the database of FIG. 6 by itself is insufficient to guide binary search. In order to guide binary search to the right half, for each prefix in the right half, we will add a marker in the median length table. This will ensure that if there is matching prefix in the right half, we will match with a marker entry in the median length table. If we get a match, we will search the right half table.

Thus in FIG. 9, we have added a marker corresponding to the first four bits of P5=11001. Thus, we have added a marker node corresponding to the 1100 entry. We have shown marker nodes using a bolded border in FIG. 9. Now when we search for A whose N initial bits are 11001000, we will get a match with the marker node and will hence search among the right half of prefix lengths. Thus we will now search among prefix lengths 5, 6 and 7. Since the median of these lengths is 6, a match in the length 4 database will take us to Length 6 database for our next search.

In what follows we will sometimes use the word extension. We say that a string S is an extension of another string Y if S can be written as the concatenation of X with some other string Y. For example, 11001 is an extension of 1100 because 11001 can be written as the concatenation of 1100 and the string 1. Notice that if M is a marker corresponding to a prefix P, then P is an extension of M.

Similarly, since the first four bits of P7 and P8 are 1000, we need to add a marker for these two nodes as well. However, we already have a prefix corresponding to 1000 (i.e., P6). Thus we will mark this node as being both a prefix and a marker. This is shown by the node containing a prefix but also having a bolded border.

On the other hand, one searching for B whose initial bits are 11100000, we will still not get a match with the first four bits equal to 1110. Thus we move to the lower half of prefix lengths (1, 2, 3). Since the median length is 2, we now try the length 2 database. Once again, since the best matching prefix is P2=111, we must add a marker in the Length 2 database for P2. Thus we need a marker corresponding to the first 2 bits of P2 (see FIG. 9). This marker will then guide us to the right again (among the lengths 1, 2, 3, only) and thus to the Length 3 database, where we will find the longest matching prefix.

How many markers do we need? It is easy to see from FIG. 9 that we need a marker for a prefix P at all lengths l reached by binary search in a search for P, such that l is less than the length of P. For example, for P5=11001, we need a marker at length 4 because 4 is the first position examined by binary search and 4<5, where the length of P5 is 5.

The following paragraph is more technical and describes a precise way to express the marker positions. More precisely, let the length of prefix P be L. Let length L be the i-th largest length among the set of distinct prefix lengths in the database. Write L in binary. Then we can describe the marker positions using the binary decomposition of L. For example, the length of P8 is 7, and 7 is the 7th among seven distinct prefix lengths. 7 in binary is 111. To find the first marker position we start with the leftmost 1 and zero out all the 1's to the right. Thus we have a marker at 110=4. To find the second marker position, we take the two leftmost ones and zero out all the 1's to the right. Thus we have a second marker at 110=6. In general, the i-th marker corresponds to keeping the leftmost i 1's and zeroing the 1's to the right. We stop adding markers when we have already added j-1 markers, where j is the number of 1's in the binary decomposition. As a second example, consider P2=111. Now the length of P2 is 3 and it is the 3rd highest prefix length. The binary decomposition of 3 is 011. Thus we add only 1 marker at position 010=2 which is reflected in FIG. 9.

A consequence of this rule is that the number of markers we have to add for a prefix P is one less than the number of 1's in the binary decomposition of the position of prefix P's length. This can at most be $\log_2 W - 1$, where W is the number of distinct prefix lengths. This can at most be $\log_2 W - 1$, where W is the number of distinct prefix lengths. This for IPv4 we only add at most 4 markers per prefix, and 6 markers per prefix for Ipv6. Note that in many cases, we will add less markers. This can be because the number of 1's in the binary decomposition may be small (e.g., P4 in FIG. 9 whose length is 1 and whose binary decomposition is 001; i.e., it does not contribute any markers). It can also be because many prefixes share the same marker (for example P7 and P8 in FIG. 9 share marker 1000 which is itself a prefix.). However, it is nice to have a worst case bound on marker storage.

Assume that we mark each node in each table as being either prefix only, marker only, or as being both prefix and marker. In FIG. 9, the node containing P4 in the length 1 database is prefix only; in the length 2 database, the node containing 11 is a marker only.

Finally, the node containing 1000 in the length 4 database is both a marker and a prefix.

The binary search algorithm so far can be expressed as follows. Let m be the median prefix length. We start by searching in the length m table. If we get a match with a prefix only node, we terminate (if there was better information to the right, this node would have contained a marker.) If we get a match with a marker only or prefix-cum-marker node, we move to the right by searching the table corresponding to the median among all prefix lengths strictly greater than m. If we fail, we move to the right by searching the table corresponding to the median among all prefix lengths strictly less than m. We continue this process until we either terminate with a match on a prefix only node or when we have no more prefix lengths to search.

Thus in searching for address A whose first 8 bits are 11000000, we start by searching for the first 4 bits of A (i.e., 1100) in the median length (i.e., length 4 table in FIG. 9). Since we get a match with a marker node, we are now left with lengths strictly greater than 4—i.e., 5, 6, 7. The median of these lengths is 6. So we use the first 6 bits of A (i.e., 110000) and search in the length 6 table. Since we fail to find a match, we move let to the only remaining length (i.e., 5). This time when we take the first 5 bits of A and search in the length 5 table we get a match with a prefix only node, and we are done. The best matching prefix of A has been found to be 11001.

Unfortunately, this algorithm is not correct as it stands and does not take logarithmic time if implemented naively. The problem is that while markers are good things (they lead to potentially better prefixes to the right), they can also cause the search to follow leads which may fail! In case of failure, we would have to modify the binary search (for correctness) to resume starting the lower half of R again. Such a naive modification can lead us back to linear time search. An example will clarify this.

Consider a search for an address C whose first eight bits are 11000000. The process is very similar to the search for address A described above. We again start by searching for the first four bits of C (i.e. 1100) in the length 4 database of FIG. 9. We find a match with a marker node. This causes us to move to the right, and search for the first six bits of C (i.e., 110000) in the length 6 database. When this fails, we try the only remaining length, and search for the first 5 bits of C (i.e., in the length 5 database). Unlike in the case of A, however, we fail. Thus we end up by finding no best matching prefix for C. But this is clearly wrong as the best matching prefix of C if really P4=1*.

The problem is that the marker indicating 1100 indicating that there are longer prefixes starting with 1100 (indispensable in the search for A) is misleading in the case of C. When we search among the longer prefixes we find nothing. The actual best matching prefix is to the left of the marker 1100 (see FIG. 9). The problem is that markers essentially say "Possible longer prefixes to the right. No guarantees, however," We have to follow the marker in case of better information (e.g., this worked well in searching for A) but we may also hare off on a wild goose chase (e.g., in searching for C).

One naive fix might be to backtrack, in case of failure, to the last marker point. For example, in the case of a failure for C, we backtrack and start searching the left half of prefix lengths less than 4. While that works, it can increase the search time from $\log_2 W$ to $0(W)$, thus obviating all the gains of binary search. The following example can be used to show this.

A worst-case example for say W bits is as follows: we have a prefix $P_i$ of length i, for 1<i<W that contains all 0s. In addition we have the prefix Q whose first W-1 bits are all zeroes, but whose last bit is a 1. If we search for the W bit address containing all zeroes then we can show that binary search with backtracking will take 0(W) time and visit every level in the table. (The problem is that every level contains a false marker that indicates the presence of something better below.)

We have the following quandary: we need markers to guide us to possibly longer matching prefixes. But markers can also mislead us, leading to potentially expensive backtracking. We now discuss how to avoid this quandary.

The idea is to avoid having to backtrack, when we fail after following a marker. Suppose every marker node M is a record that contains a variable M.bmp, which is the value of the best matching prefix of the marker M. (This can be precomputed when the marker M is inserted into its hash table.) Now, when we find M at the mid point of the current range of prefix lengths, we indeed search the right half, but we also remember the value of M.bmp as the current best matching prefix. Now if the right half of the range fails to produce anything interesting, we need not backtrack, because the results of the backtracking are already summarized in the value of M.bmp.

We first redraw FIG. 9 in FIG. 10 by adding bmp values to all nodes in all tables. We will discuss later how this can be computed when the table is filled. For example, consider the marker node 11 in the length 2 table. The best matching prefix of the string 11 is P4=1*. Thus the bmp value of the marker node 11 is set to be P4. Similarly, consider the marker node 1100 in the length 4 table. The best matching prefix of the string 1100 is again P4=1*. Thus the bmp value of 1100 is set equal to P4. On the other hand, if a node is a prefix or a marker-cum-prefix node, then its bmp value is equal to the prefix it contains. Thus, note 1000 in the Length 4 database has best matching prefix equal to itself, which is P6.

We can now see how we avoid backtracking and still get the correct answer. We return to the example of searching for C in which we ran into difficulties above.

We again start by searching for the first four bits of C (i.e. 1100) in the length 4 database of FIG. 9. We find a match with a marker node. This causes us to move to the right and search in the Length 6 database. But before we do so, we remember the bmp value of the marker we just encountered. Since the bmp of 1100 is P4, we remember P4. As before, we now search for the first six bits of C in the length 6 database. When this fails too, we return with the bmp value of the last marker we encountered. Since this happens to be P4, we have found the right answer.

The final binary search algorithm can be expressed as follows. Let m be the median prefix length. We start be searching in the length m table. If we get a match with a prefix only node, we terminate (if there was better information to the right, this node would have contained a marker.) If we get a match with a marker only or prefix-cum-marker node, we update a variable bmp to the bmp value of marker. We then move to the right by searching the table corresponding to the median among all prefix lengths strictly greater than m. If we fail, we move to the right by searching the table corresponding to the median among all prefix lengths strictly less than m. We continue this process until we either terminate with a match on a prefix only node or when we have no more prefix lengths to search. When we terminate we output the variable bmp (which has been used to remember the bmp value of the last marker encountered in the search path.)

A precise description of the algorithm can be found in the Detailed Description of the Preferred Embodiment along with a method for building the database of markers and prefixed.

We now show how we can reduce the number of levels we search in simple binary search on levels whenever we get a match. This optimization, which we called Rope Search can greatly improve the average search time. It is useful to describe Rope Search using a conceptual model of this more dynamic binary search in terms of tries. This allows us to easily map between concepts in rope search and the corresponding concept in tries.

In FIG. 11, we redraw FIG. 7 so that the same trie is broken into levels. All nodes whose path to the root is i as shown at Level i using a dashed line. We can think of binary search (as in FIG. 10) on Levels as first doing an exact match on all trie nodes (as represented by their complete path from the root to the node) at the median level (i.e., 4 in the example shown). If we get a match, we go the median of the lengths greater than 4; if not, we try the levels in the upper subtrie with lengths less than 4.

The trie picture is modified in FIG. 12 to show how Rope Search optimizes simple binary search to dynamically changes tries as it proceeds. Suppose we are currently searching for P in the big trie shown. Then binary search starts at Length m, where m is the median length among all lengths in the big trie. Each trie node at this level (see dashed line) has an entry in the Level m hash table. If the first m bits of P match some entry X in this hash table, then the new trie is the trie rooted at X. The trie rooted at X contains all prefixes that are an extension of X (for example 100* is an extension of 10*). If we fail to find a match, the new trie is the original trie except that the part including level m and below is cut off. This process continues recursively.

Thus the whole idea in Rope Search is as follows: whenever we get a match and move to a new subtrie, we only need to do binary search on the levels of the new subtrie. In other words, the binary search changes the levels on which it searches dynamically (in a way that always reduces the levels to be searched) as it gets more and more match information.

The main difficulty is to find a way to efficiently encode the binary search path for each subtrie in the original trie (see FIG. 12). A naive representation would require a lot of storage. A key observation is that we only need to store the sequence of levels at which binary search on a given subtrie will follow on repeated failures to find a match. This is because when we get a successful match (see FIG. 12) we move to a completely new subtrie and can get the new binary search path from the new subtrie. The sequence of levels which binary search would follow on repeated failures is what we call the Rope of a subtrie, and can be encoded efficiently.

If we consider a trie, we define the rope for the root of the trie node as the sequence of trie levels we will consider when doing binary search on the trie levels while failing at every point. This is illustrated in FIG. 13. In doing binary search we start at Level m which is the median length of the trie. If we fail, we try at the quartile length (say n), and if we fail at n we try at the one-eighth level (say o). The sequence m, n, o, . . . is the Rope for the trie.

The Rope can also be understood by placing all Trie Levels in a perfectly balanced binary tree (see right side of FIG. 13). In that case Level m is at the root of the tree; the left child of m contains n, and the left child of n contains o, and so on . . . Thus the rope can be considered to be the "left skeleton" of this binary tree as shown by the dotted oval.

Thus the generic Rope Search algorithm is as follows. We start with an initial Rope which is the Rope (sequence of median, quartile etc. levels) of the original subtrie. At each step we take the first level of the current rope, say level m; we try for a match at level m. If we succeed, we take as our current rope the rope of the subtree rooted at m. If we fail, we continue with the next element of the current rope. We continue this loop until the Rope is exhausted (i.e., become the null string.) As before, we keep a BMP variable which is updated at every match. We finally output BMP.

Note that Rope Search requires all nodes in the database (see FIG. 10) to not only contain bmp values but also to contain a variable called Rope. Rope is a sequence of up to $\log_2 W$ levels, each of which can be encoded in $\log_2 W$ bits. Thus we need only 49 bits per node for Ivp6 and 25 bits per entry for Ipv4 which is fairly small storage.

A detailed description of Rope Search and the procedure to build the Rope Search Database can be found below.

BRIEF DESCRIPTION OF THE DRAWINGS

FIG. 1 is a schematic diagram of a hypothetical fragment of the internet.

FIG. 2 is a block diagram illustrating the functioning of a router.

FIG. 3 is a schematic diagram illustrating operation of a hypothetical internet fragment.

FIG. 4 is a table illustrating a modified database of prefixes corresponding to data links.

FIG. 5 is a table of sample forwarding address prefixes.

FIG. 20 is flow chart of the software for inserting markers in a database corresponding to a particular prefix.

FIG. 22 is a high level source code listing for the software to perform a rope search.

FIG. 23 is a high level source code listing for the software required to do recursive hash building.

FIG. 27 is a diagram similar to FIG. 26 which further illustrates the Hash Table after the upper half is filled in and the median level of the original trie is also filled in.

FIG. 30 is a high level source code listing of software for building rope from a set of lengths/levels.

DETAILED DESCRIPTION OF PREFERRED EMBODIMENT

We first describe the working of a router. An important part of the router process to forward a message is the problem of destination address lookup in a forwarding table of address prefixes. We then describe our invention, which shows how to provide faster address lookups, in two parts. We show how to do multi-step prefix length binary search and how to build the database for such a search. We then show how to do the more optimized Rope Search.

Figure 14:
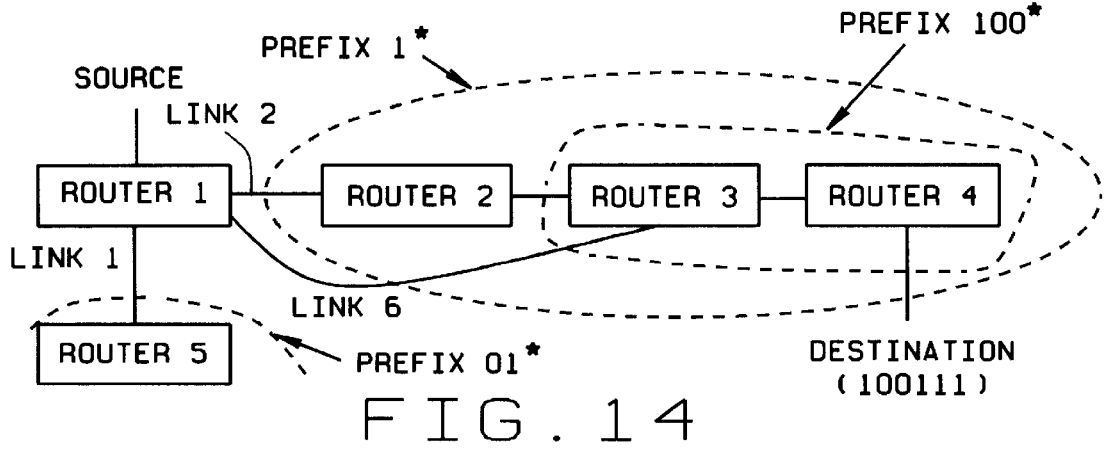
FIG. 14 is a block diagram illustrating a typical data communication or telephone network using prefixes.

Although our invention can be used in other contexts for doing fast best matching prefix, we describe our invention in the context of a communication network that is used to forward messages (e.g., the Internet) or calls (e.g., telephone network). FIG. 14 shows an example data communication network. It consists of devices called Routers (boxes) connected by communication links (shown as lines connecting boxes). Communication links include links such as fiber optic links, Enternet links (which can connect more than one router), satellite links, etc. that allow a message to be sent directly between two routers. In case of a telephone network, the situation is similar except that messages are replaced by telephone calls and routers are often referred to as telephone switches. For the rest of this description, we will use the data communication network terminology. However, one of ordinary skill in the art would understand that the present invention could be implemented in other environments such as telephony.

Figure 15:
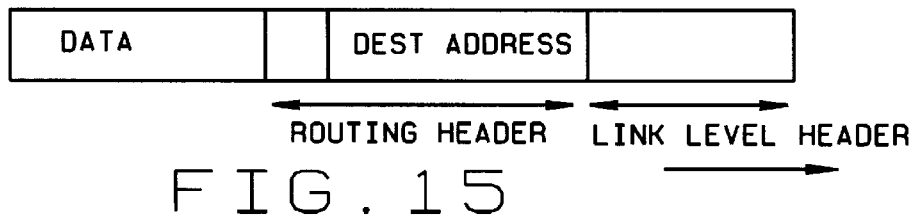
FIG. 15 is a diagram illustrating the message header of a data packet.

The main function of a communication network is to route messages (sometimes called packets in data communications) sent by any source to any specified destination. FIG. 15 shows the format of a message sent by the source to a destination. The front of the message contains a link level header, followed by a routing header that is examined by routers. The routing header contains the destination address of the intended recipient, typically encoded as a binary number. The routing header also contains other fields such as a visit count and other fields that vary in different routing protocols.

Routers forward messages by looking up the message destination address in a Forwarding Table to determine the output link, and then forwarding the message to the corresponding output link. In order to reduce the size of Forwarding Tables, the Forwarding Table may consist of entries corresponding to prefixes. Throughout the text hereof, we refer interchangeably to prefixes, entries, prefix entries, etc. Strictly speaking, and as used in the claims, a database or sub-database is populated with entries corresponding to either one of a prefix, a marker, or a prefix-cum-marker, as is explained more fully below. A prefix represents a group of destinations whose address all being with that prefix. For example, in FIG. 14, Routers 2, 3 and 4 and the destinations they serve are described by Prefix 1*. Prefixes may be nested within other prefixes. In FIG. 14, Routers 3 and 4 can reach the prefix 100*, which is contained in the group covered by prefix 1*.

The router forwarding table will store the corresponding output link to reach every prefix that it knows about (this information is obtained using various routing update protocols). For example, Router 1 will contain an entry which says that Prefix 1* is reachable through Link 2, and Prefix 100* is reachable through Link 6 (see FIG. 14).

To forward a message (with destination address say 100100), the router must lookup its forwarding table for any prefixes that match the destination address in the message. If more than one prefix match, the router picks the prefix that has the longest match. For example, in forwarding a message to 100100, this address matches both 100* and 1*, however, 100* is the more specific match, and so the message must be sent to Link 6. Note that FIG. 14 is only an extremely simple example of a routing network or internetwork; our invention clearly applies to other networks built along similar principles that use longest matching prefix forwarding.

We can now describe the workings of a router (e.g., Router 1 in FIG. 14). A router (FIG. 16) consist of Input Links 1 through m, and corresponding output links 1 through n (in most cases, a router has the same number of input and output links but not always). Corresponding to each input link there is a link interface (L1 through Lm) and corresponding to each output link there is a link interface (O1 through On). Each link interface contains the circuitry to send and receive messages on a particular link, and (possibly) buffers to store messages temporarily before they are forwarded.

Figure 16:
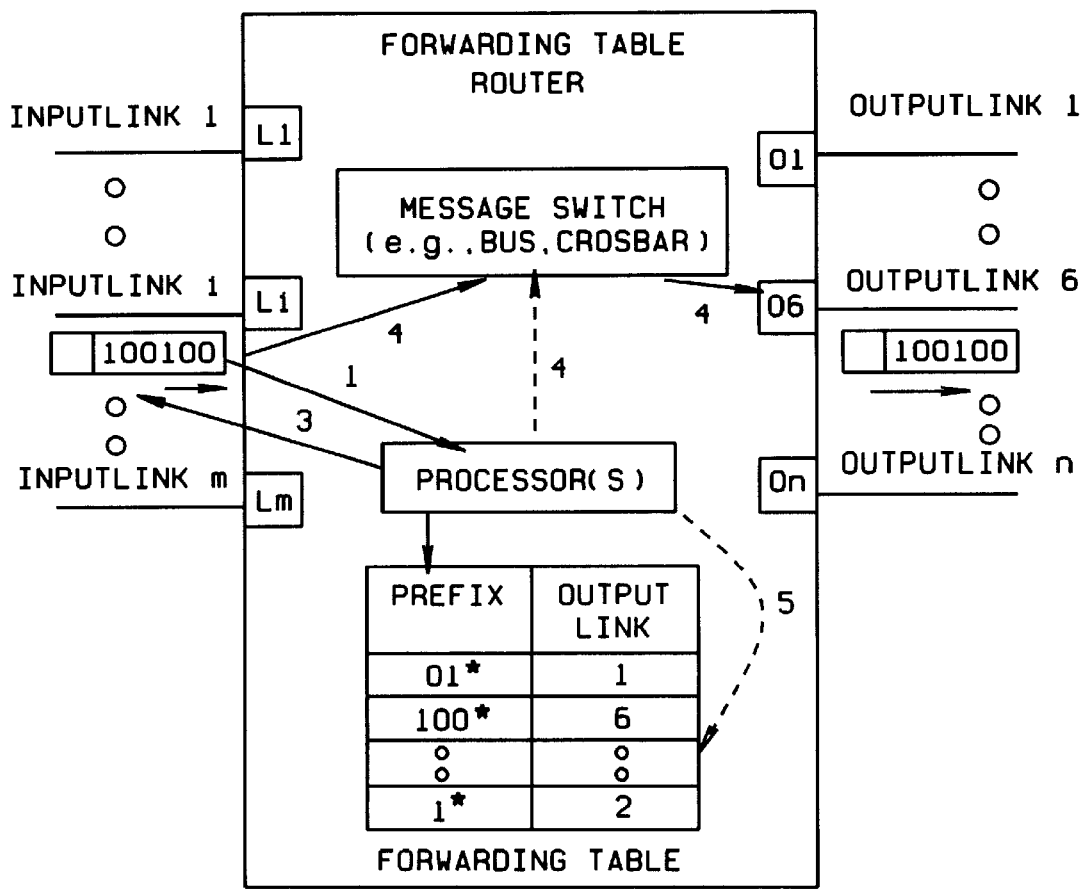
FIG. 16 is a block diagram of router in hardware and illustrating its operation.

The two other main components of a router are a message switch subsystem and a processing subsystem (see *-H° FIG. 16). The processing subsystem could be a single Ad processor, group of processors, a processor per link, or various hardware state machines. The message switch subsystem is responsible for switching a message from an inout link interface to an output link interface under command from the processing subsystem. Typical message switch subsystems contain one or more computer busses, a crossbar switch, or more sophisticated switching systems. In some routers the switching subsystem function is performed by one of the processors; in some cases, it is done by independent hardware.

The typical algorithm for forwarding a message is as follows. When a message arrives at say Input Link i, it is stored in the corresponding link interface. Some time later, a processor in the processing subsystem reads the destination address (1 in FIG. 16), then does an address look (2). The result of the address specifies the output link corresponding to the longest prefix match. Some fields in the message are then (3) updated (e.g., often a visit count is incremented and the link headers are sometimes updated). Finally the message is switched (4) to the specified output link. This is done by the CPU specifying the details of the message, input and output links to the switching subsystem (shown by dotted arrow labeled 4). The switching subsystem then actually transfers the message (shown by solid arrows labeled 4).

For example, a message sent to destination address 100100 in FIG. 16 is matched to prefix 100* and is switched to output Link 6. Returning to FIG. 14, it will be appreciated that a message from the source to the destination, is sent by having each router in the path do a similar algorithm.

Finally, in FIG. 16, we have one more function performed by a router. Periodically, when the router get new routing updates from other routers, the router may rebuild its forwarding table to add or delete some prefixes (5).

Our invention includes a novel method of arranging prefixes in a binary search database (5) in order to make the lookup (2) an order of magnitude faster. We now describe this in the following sections.

Figure 17:
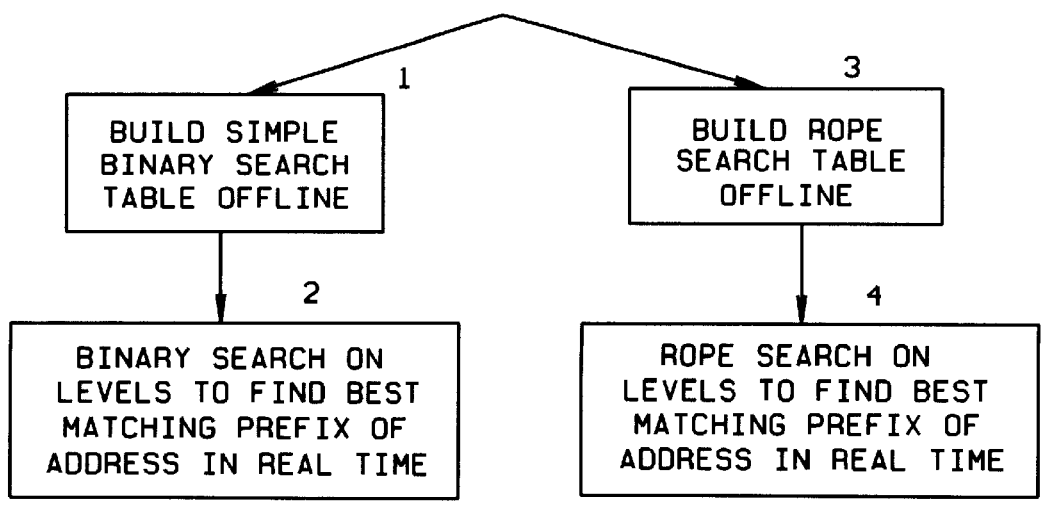
FIG. 17 is a block diagram illustrating the overall method steps utilized in binary searching and rope searching.

FIG. 17 shows the organization of our approach to providing faster longest matching prefix lookups. This includes both the step of table building (5 in FIG. 16) and the step of address lookup (2 FIG. 16).

We start with a set of prefixes that the router receives from routing updates. Any standard textbook on routing (e.g., *Interconnections* by Radia Perlman) describes how routers receive information about prefixes from each other. Next, we describe two methods for table building and address lookup. In the simplest embodiment of our ideas (useful for its simplicity), we do simple binary search on levels 1, 2.

We also describe a more sophisticated and highly optimized method called rope search and the accompanying database building procedure.

We first precisely describe the lookup procedure for simple binary search referred to in box 2 of FIG. 17 which corresponds to Step 2 of FIG. 16. We then describe the table building procedure for simple binary search on Levels (box 1 of FIG. 17 which corresponds to Step 5 of FIG. 16).

Figure 18:
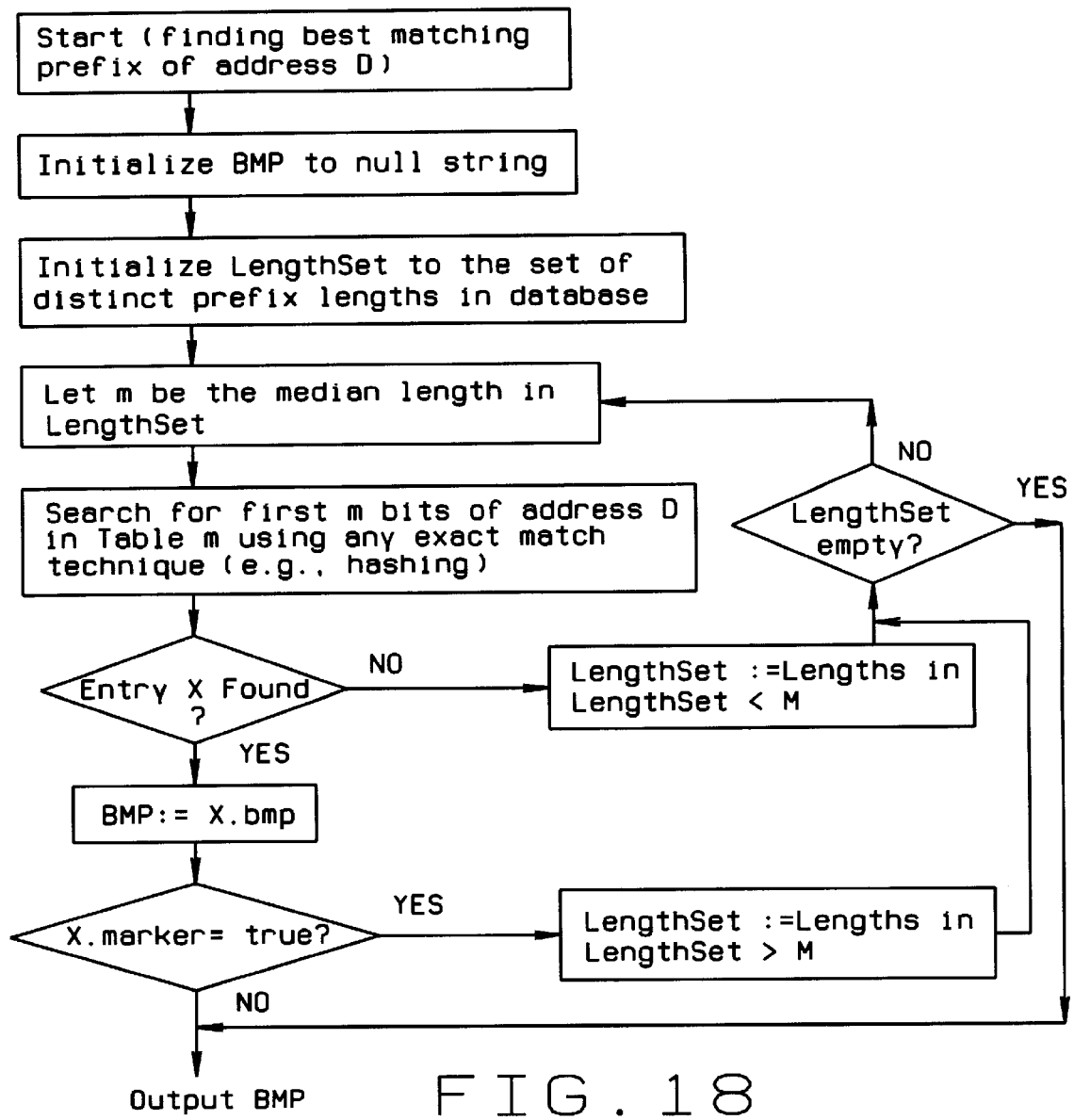
FIG. 18 is a flow chart of the software required to perform the binary search algorithm on prefix lengths to compute the best matching prefix of an address D.

A flowchart describing the algorithm more precisely is shown in FIG. 18. We use a variable LengthSet which keeps track of current set of lengths we think the best matching prefix may belong to. Initially, LengthSet is equal to the set of distinct prefix lengths in the database. We initialize BMP, which stores the best matching prefix encountered so far, to nil. In the main loop, we find the median length m in this set of lengths and the we search for the first m bits of the target address D in the Length m Table.

If we do not get a match, we update LengthSet to be equal to the set of lengths in LengthSet that are strictly less than m. If we get a match with some entry X, we update the BMP variable to the bmp value of X. Finally, if X.marker=true (i.e., this entry is either a marker or a marker-cum-prefix) we update LengthSet to be equal to the set of lengths in LengthSet that are strictly more than m. Otherwise, if X is not a marker (i.e., a pure prefix), we simply exit. We continue the loop until we either exit or the LengthSet shrinks to become empty.

Figure 6:
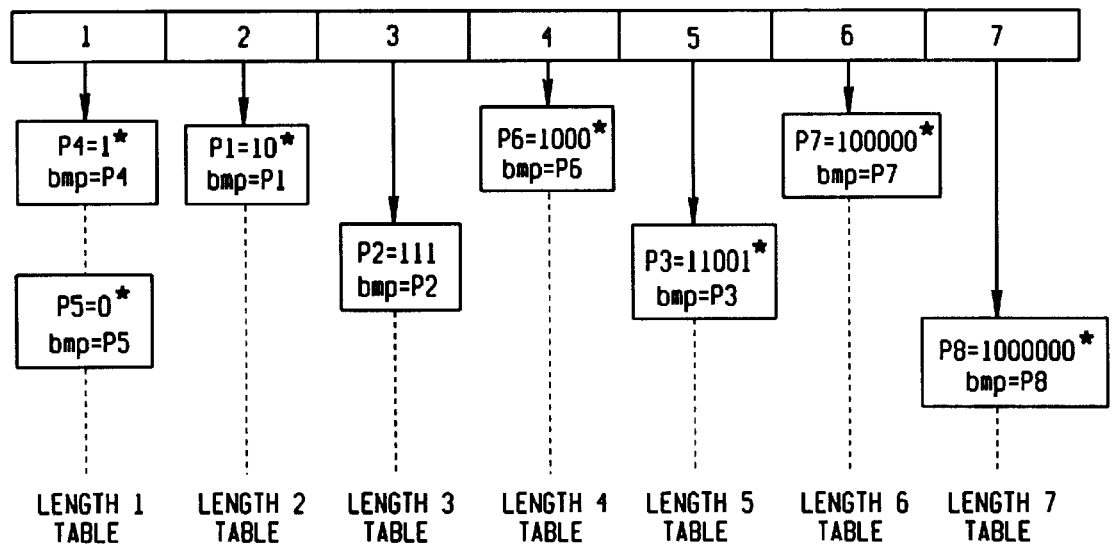
FIG. 6 is an illustration of the data contained in FIG. 5 redrawn and organized by prefix length into sub-databases.
Figure 7:
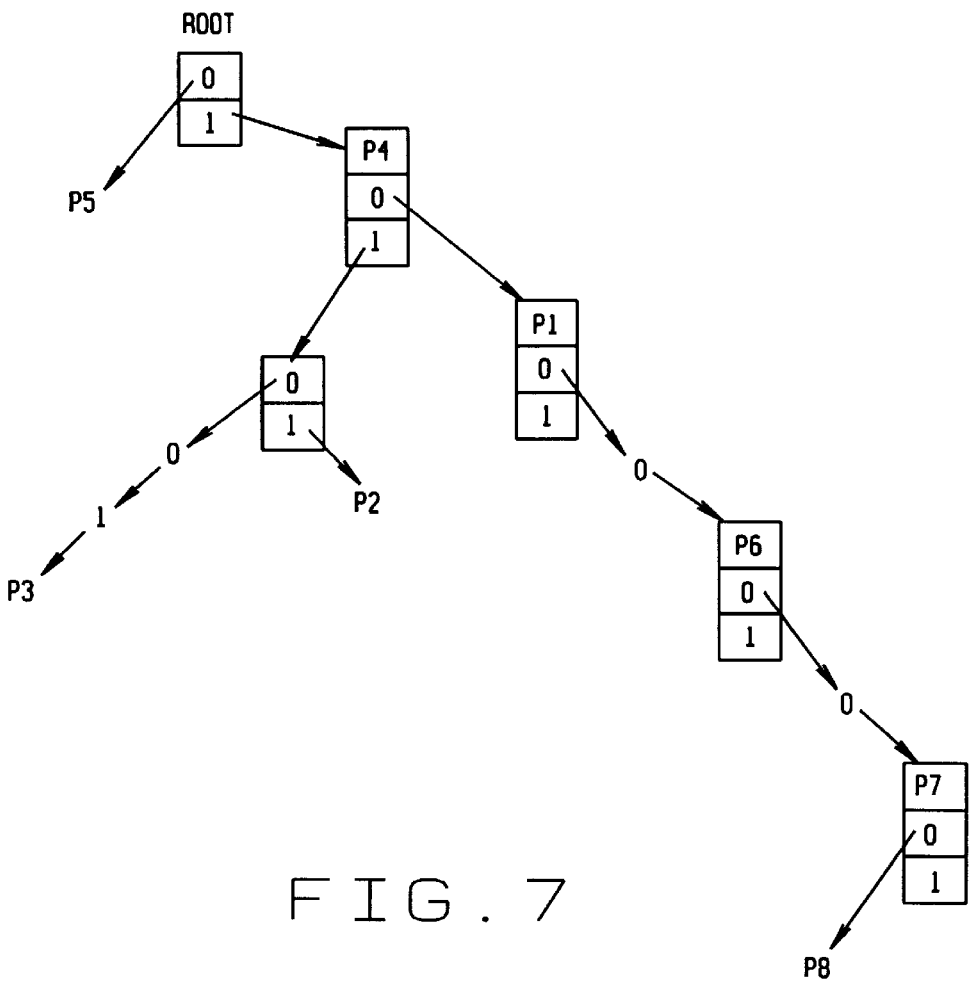
FIG. 7 is an illustration of the information contained in FIG. 5 reorganized into a trie architecture.
Figure 8:
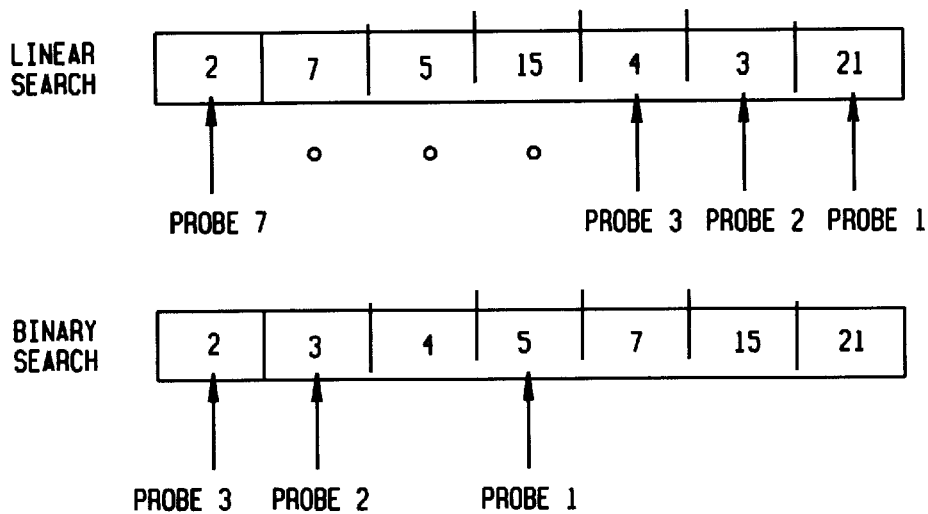
FIG. 8 includes a pair of tables to illustrate the differences between linear searching and binary searching.
Figure 9:
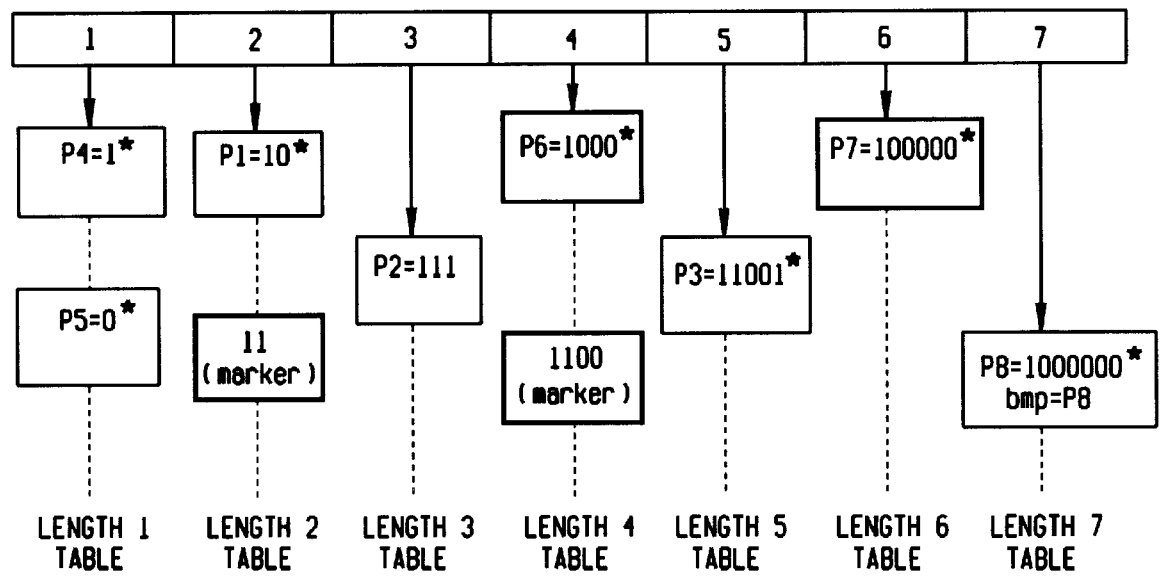
FIG. 9 is a table illustrating the database of FIG. 6 enhanced to add marker entries.
Figure 10:
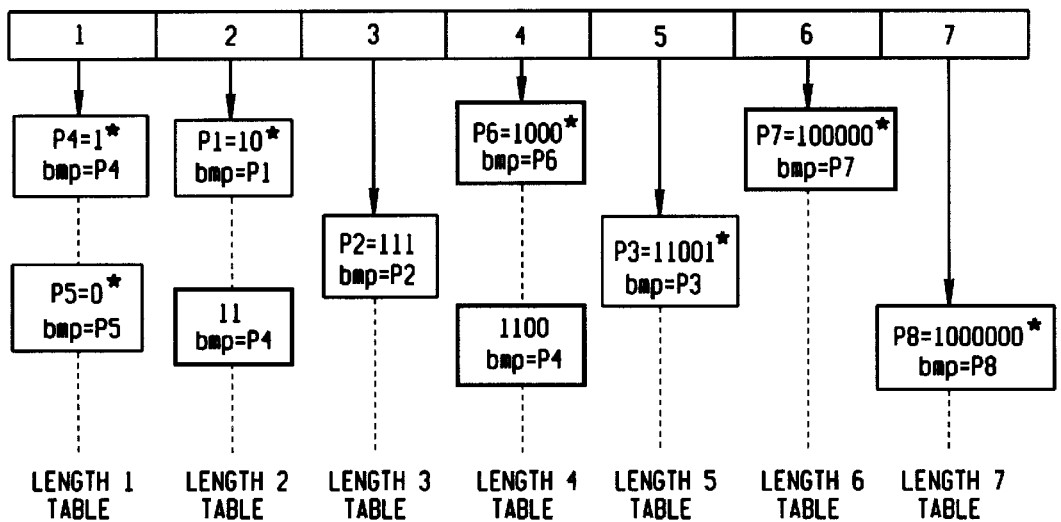
FIG. 10 is a table corresponding to the table of FIG. 9 enhanced to add the precomputed best matching prefix values.
Figure 11:
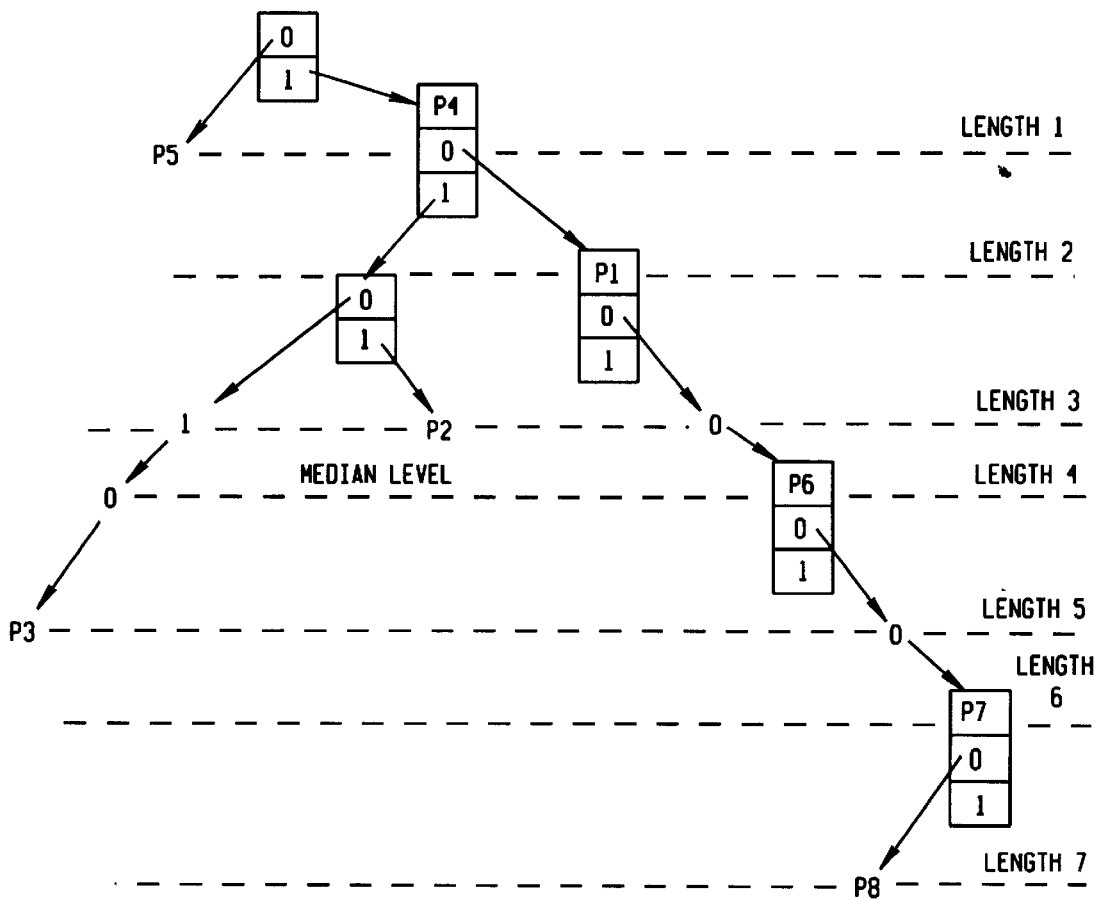
FIG. 11 is a diagram containing the information of FIG. 7 represented in a trie architecture.

Consider a search for an address C whose first eight bits are 11000000 in FIG. 10. (The initial value of LengthSet is {1, 2, 3, 4, 5, 6, 7}.) We take the median of this set of lengths to be 4. (The median of an even number of numbers like {2, 5, 6, 7} can be taken to be either of the two middle elements, i.e., 5 or 6 in this example.). We first search the Length 4 table. We find a match with X=1100. We update the BMP value to be P4. Since this is a marker node (see FIG. 10), we also adjust LengthSet to be the set of lengths in the original set whose values are strictly greater than 4.

Thus the new value of LengthSet becomes {5, 6, 7}.) We take the median of this set of lengths to be 6. We then fail to find a match in the Length 6 table, and so LengthSet becomes the set of lengths that are less than 6, i.e., {5}. The median of this set is 5. Since we fail to find a match in this table as well, we now shrink LengthSet to the empty set and exit the loop with the value of BMP equal to P4.

Finding the medians and shrinking LengthSet can be efficiently implemented by having the initial set of distinct lengths be held in a sorted array. Then shrinking the set can be accomplished by defining two indices into the array to define the start and end of the current set of lengths. The index of the median length can then easily be calculated as the average of the start and end indices.

Figure 19:
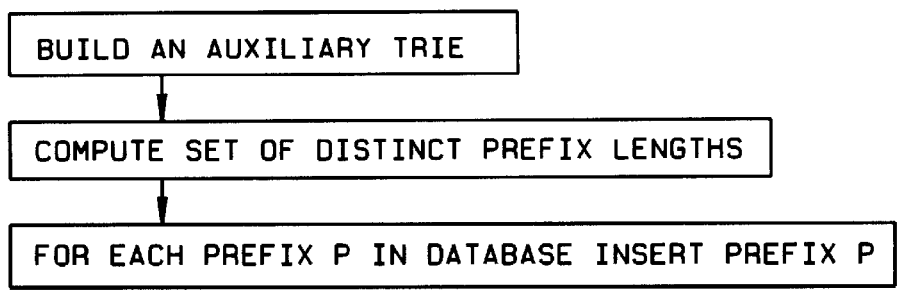
FIG. 19 is a flow chart illustrating the software to perform an overall insertion strategy using a trie.

We next describe box 2 of FIG. 17 and Step 5 of FIG. 16 for simple binary search on levels. To build the database of tables (e.g., as in FIG. 10) together with precomputed bmp values we follow the strategy shown in FIG. 19 whenever a new prefix is added or deleted from the database.

We first build a trie (see earlier description and reference) using standard techniques. The trie is useful to calculate the precomputed bmp values for markers. We then calculate the set of distinct lengths in the prefix database. This can easily be done by keeping an array indexed by possible lengths, all of which are set to 0; we then go through each prefix P with length say L and set the bit corresponding to L in the array to 1. Finally, the set of array entries with a 1 bit set correspond to the set of distinct lengths. This can then be copied to another array which lists the lengths in sorted order.

Finally, we insert the markers corresponding to each prefix P using the routine shown in FIG. 20. The basic idea is to simulate the search algorithm show in FIG. 18. Whenever, the search algorithm reaches a length m that is is less than or equal to the length of the prefix, we must clearly add a marker.

Figures 21, 24, 25:
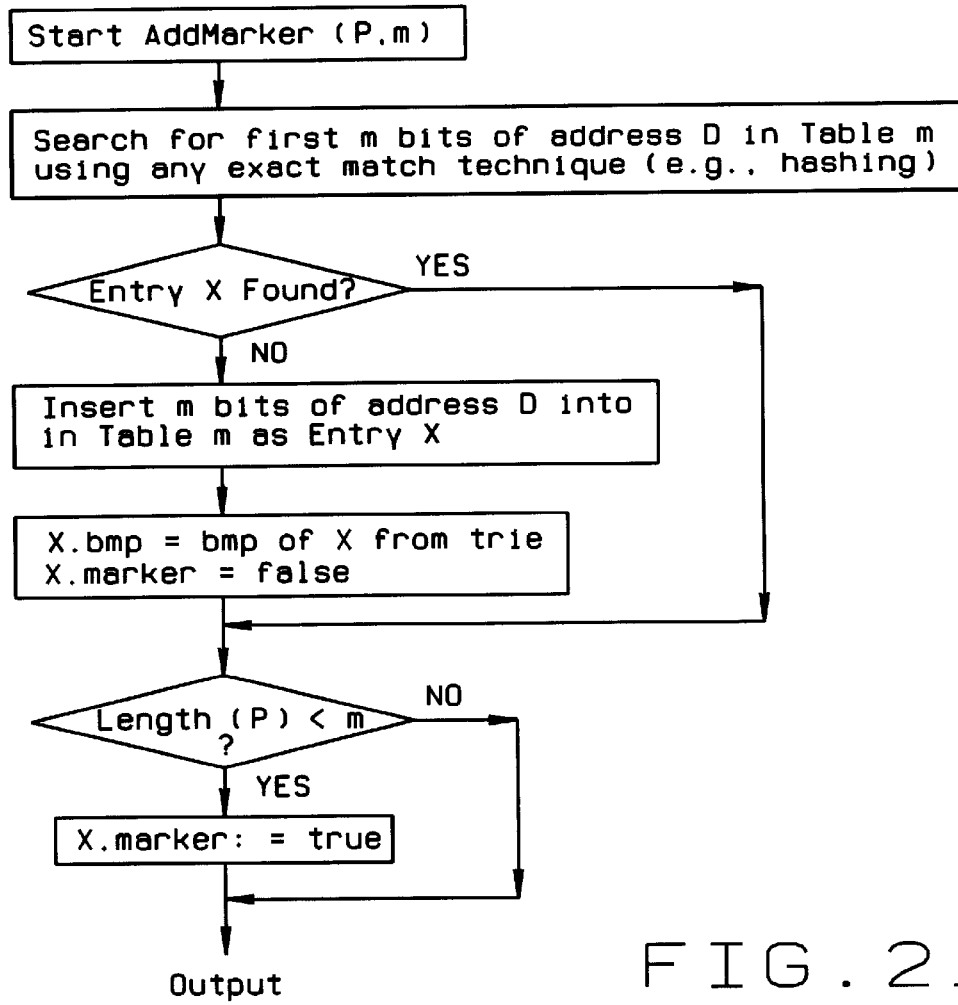
FIG. 21 is a flow chart of the software utilized to add a marker entry.
FIG. 24 is a high level source code listing for software for building a rope from a set of lengths/levels.
FIG. 25 is a table of sample prefixes used to illustrate a Rope Search.

The actual marker addition is done by a separate routine shown in FIG. 21. The basic idea is that we first look up the Table corresponding to Length m to see if the marker already exists. If it does, we still have to update the marker bit if its not already set, and length m is strictly less than the length of the prefix. Finally, if it does not exists, we add an entry X to the corresponding table. We find X.bmp using the trie we have already built. We also initialize X.marker to false, but immediately check whether length m is strictly less than the length of the prefix. If so, we set the marker bit.

The algorithm just described processes the whole database whenever a new prefix is added or deleted. A more incremental algorithm can be done by doing the Insert algorithm for an individual prefix when a new prefix is added. However, adding the new prefix changes the bmp values of all markers in the subtrie rooted at the new prefix. This can easily be found using the trie. Similarly, when deleting a prefix P, we have to potentially delete all markers and change the bmp values of all markers whose bmp values were equal to P.

We now precisely describe the lookup for Rope Search referred to in box 4 of FIG. 17 which corresponds to Step 2 of FIG. 16. We then describe the table building procedure for Rope search on Levels (box 3 of FIG. 17 which corresponds to Step 5 of FIG. 16.)

Figure 12:
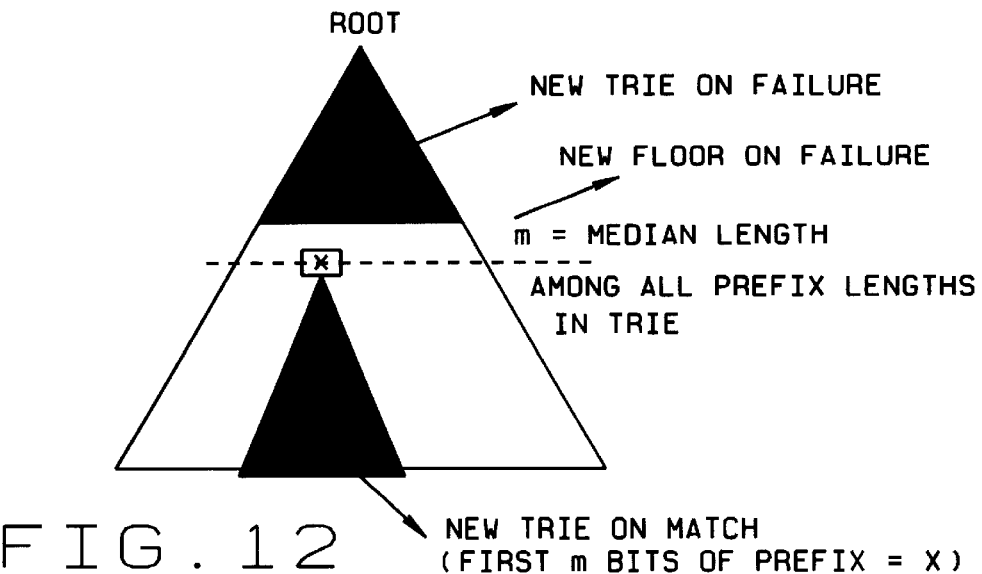
FIG. 12 is a diagram illustrating Rope Searching in terms of a trie.
Figure 13:
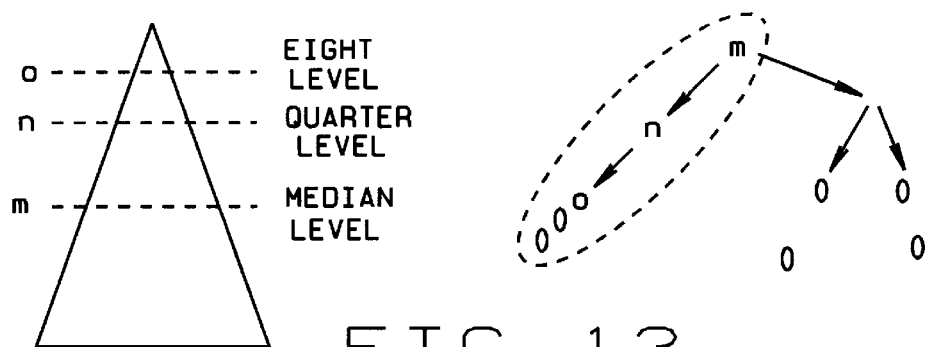
FIG. 13 is a diagram illustrating a rope in terms of a trie.

The Rope Search code is described in FIG. 22. This code starts with the initial Rope and continues till the Rope is nil. At each stage, it checks for a match based on the current level; if so, it follows (see FIG. 12) the new Rope of the new subtrie; otherwise (see FIG. 12) it moves to the Rope of the upper subtrie by discarding the first element of the current Rope. At each match, it also updates the bmp value.

We now describe box 3 of FIG. 17 and Step 5 of FIG. 16 for rope search on levels. To build the database of tables (e.g., as in FIG. 10) together with precomputed bmp and Rope values we use a clever recursive algorithm that is used whenever a new prefix is added or deleted from the database.

We describe the recursive construction to build the entire hash table from scratch. It's based on the picture in FIG. 12. The idea is to recursively split the trie based on the median length. We recursively apply the algorithm to the upper subtrie (and all prefixes contained in the upper subtrie.) Then we insert markers for all markers at the median level. Finally we recursively apply the algorithm for the subtrie rooted at each marker node.

The advantages of the recursive algorithm described below are that it does not build or use an auxiliary trie. Second, it takes $O(N \log^2 W)$ time which is only slightly worse than lower bound of $O(N \log W)$. Notice that unlike the previous scheme we insert all the markers at a given length at one (for all prefixes). On the other hand, the previous scheme adds all the markers corresponding to each prefix at once and iterates over all the prefixes.

One difficulty with not having a trie is that it seems hard to calculate the bmp values of the markers. A nice idea is to take advantage of the fact that (see FIG. 12) we build the upper subtrie first. Thus the bmp values corresponding to markers in the median level can be found by doing Rope Search on the upper subtrie. Thus we have to do one Rope Search (cost log W) markers that leads to a cost of at least $0(N \log^2 W)$.

Unfortunately, doing a Rope Search works only on the first level of recursion but on the later levels of recursion, the Rope Search will be done only on the upper half of the current subtrie. But that will lead to incorrect answers as the real bmp may be anywhere in the original trie above the median level and not just in the current subtrie. A trick that fixes this problem is to have the root of each subtrie pass a "seed bmp value" along with its recursive call. The seed bmp value is the bmp value of the root of the subtrie. Thus if we find nothing better in the subtrie, we just use the see bmp value. The initial seed bmp value is nil.

The code is shown in FIG. 23. The recursive routine is called initially by calling:

Recursive Has Build (StartRopeStorage, PrefixList.nil)
where PrefixList is a sorted list of all prefixes in database, StartRope is equal to StartRopeStorage.Rope, and nil is the initial seed bmp value.

The reason for the awkwardness with Rope and RopeStorage is that the recursive algorithm generally has the Rope filled out by routines it calls; thus we have to pass some kind of pointer to a Rope to the called routine. Instead of a pointer, a record call RopeStorage is passed which has a field RopeStorage.Rope.)

A more efficient way to make rope is to assume that the set of lengths is in the form of a sorted array Length, with Length[i] being the length of the i-th largest element in the set, and the Length [0] is the number of distinct lengths. Now the first element of the rope (the median), corresponds to element ⌈(Length[0]/2⌉ of Length, and similarly all the rope elements can be computed in log (Length[0]) time by just array indexing. The code in FIG. 24 takes this view.

For example if we have the sorted set of lengths 2, 5, 7, 11. The code will pick the median element to be the ](4/2)⌈ th element which is the second element (i.e., 5). Next it will pick the ](4/2)⌈-th entry, which is the first entry (i.e., 2). Thus the rope will be the sequence 5,2.

Let us build the database in FIG. 25 by the recursive algorithm. Initially PrefixList is the set {P1, P2, P3, P4, P5} (note that we represent the lists as sets for convenience; an actual implementation would use a singly linked list). When we compute the set S of lengths we get the set {1,2,3,5}. Making a rope out of this set, we get the sequence 2,1. This becomes the start rope. Pulling off the first element, 2, gives us the median length.

Figure 26:
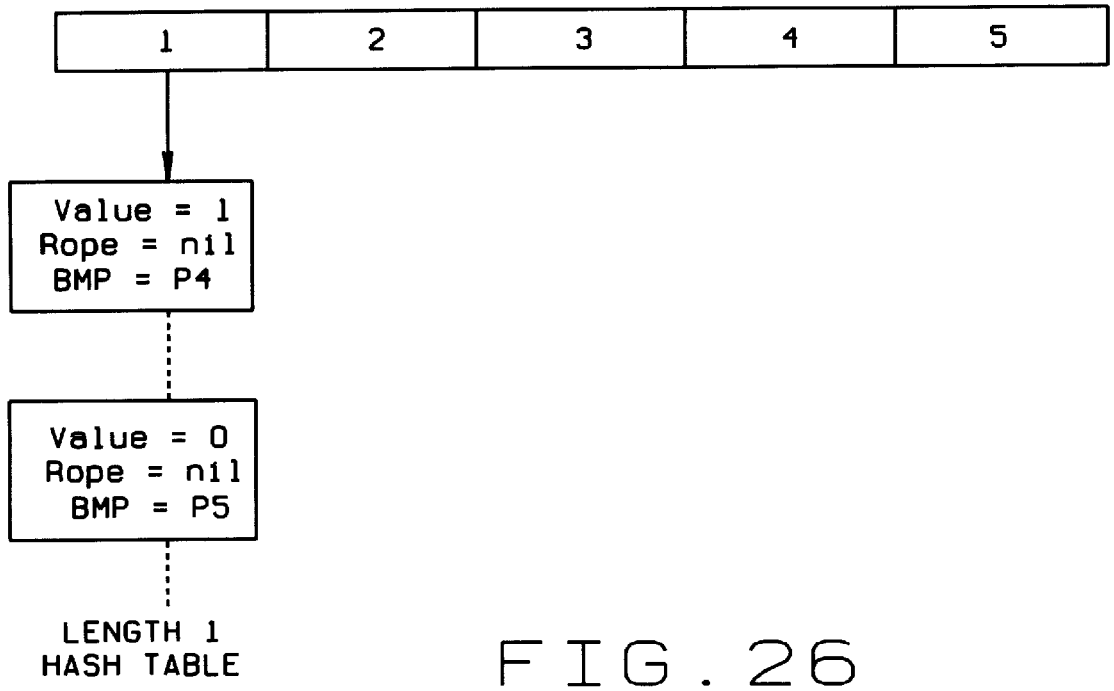
FIG. 26 is a diagram illustrating the Hash Table after the first stage of recursion completes for the upper half of the database in FIG. 25.

Next, we partition the original prefix list into two prefix lists. L1 consisted of all prefixes of length strictly less than 2. Thus L1={P4, P5}. We then call RecursiveHashBuild on L1 (the Upper Subtrie). When we do so, we find the set S only consists of the length 1 and so when we partition again, the upper "subtrie" becomes empty and returns will null rope. However, when we proceed we find two markers, 1 and 0. These are added to the hash table and we now have our first entries as shown in FIG. 26. For each of these markers in turn, we try to find their bmp value by doing a RopeSearch on the Rope of the upper subtrie. Since this Rope is nil, RopeSearch returns the value nil as well. However, since each of these markers are prefixes as well, (1=P5 and 0=P4), we overwrite their bmp values to the corresponding prefix. Finally, the associated prefix list is empty. Thus when we call RecursiveHashBuild on them we return with a null rope. At this stage we have built the hash table for the "upper subtrie" as shown in FIG. 26.

At this stage we return to the lower half. The rope of the upper half UpperRope.Rope has been returned to the sequence 1 (because list L1 had only prefixes of length 1). Recall that we now have to process list L2 ={P1,P2,P3}. Because the median m=2, we find two markers corresponding to 10 and 11. Consider marker 10 first. We add a hash entry for it in the length 2 hash table. We also search for its bmp value using RopeSearch on UpperRope=1 and find the value P4. Fortunately, because this marker corresponds to a prefix we immediately overwrite the bmp value to P1. Finally, since it has a null prefix list, we get Rope=nil.

Figure 27:
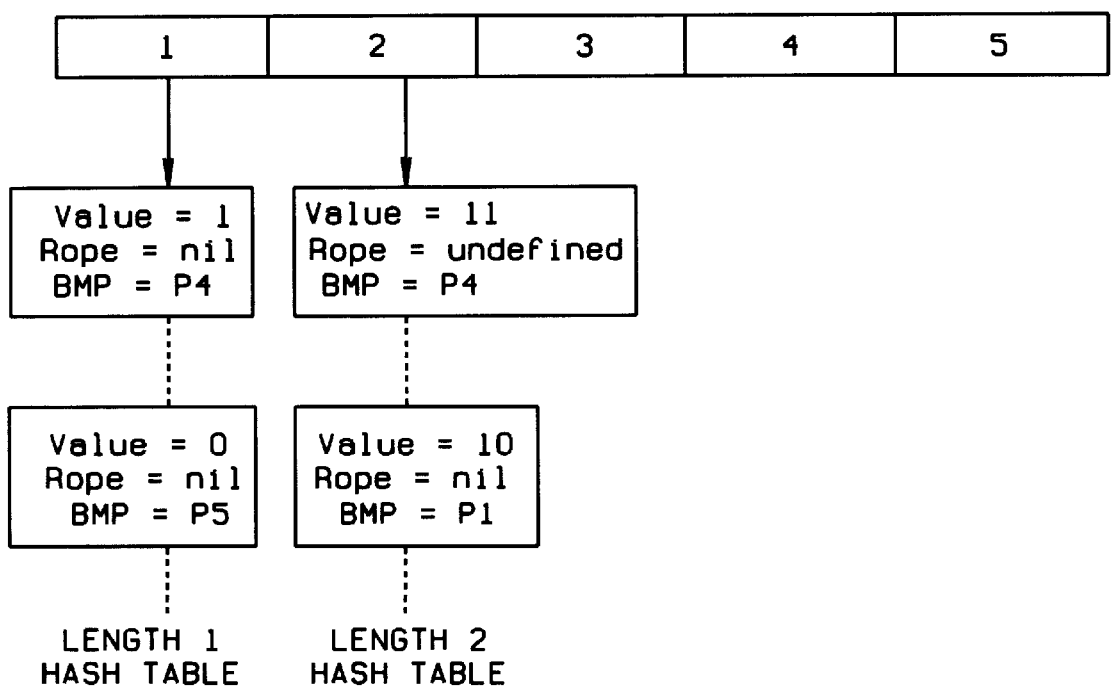

Next we consider marker 11. We add a hash entry for it in the length 2 hash table. We also search for its bmp value using RopeSearch on UpperRope=1 and find the value P4. Finally, since it has a prefix list equal to {P2,P3}. we call RecursiveHashBuild on this list with RopeStorage corresponding to the marker node for 11. At this stage, the has database looks like FIG. 27. Note that the Rope for the 11 marker is still undefined as it will be filled in only when the recursive call is executed.

At this stage we now execute RecursiveHashBuild using the list {P1,P2} with a seed bmp value of P4. We find that the set S of lengths={3,5}. We thus find that Rope=3. At this point, the Rope of marker 11 in FIG. 27 changes from undefined to 3. We also have the median m=3. Thus, L1 is empty and thus returns with an empty rope and without doing anything. Since m=3, we have two markers 111 and 110. Consider marker 111 first (although it could well have been processed after marker 110). When we try to find its bmp using the upper rope, we get the value nil. However, this is not the bmp value of 111 when we look at lengths strictly less than 3! Fortunately, the seed bmp value equal P4 is better and the bmp value of 111 becomes P4. But then since 111 is a prefix its bmp value gets overwritten again and we get the correct value P2. (Note that this shows why the seed bmp values are crucial for correctness, although the mistake would have been masked in our simple example.) Also, the prefix list of 111 is empty and so we get a nil Rope.

Figure 28:
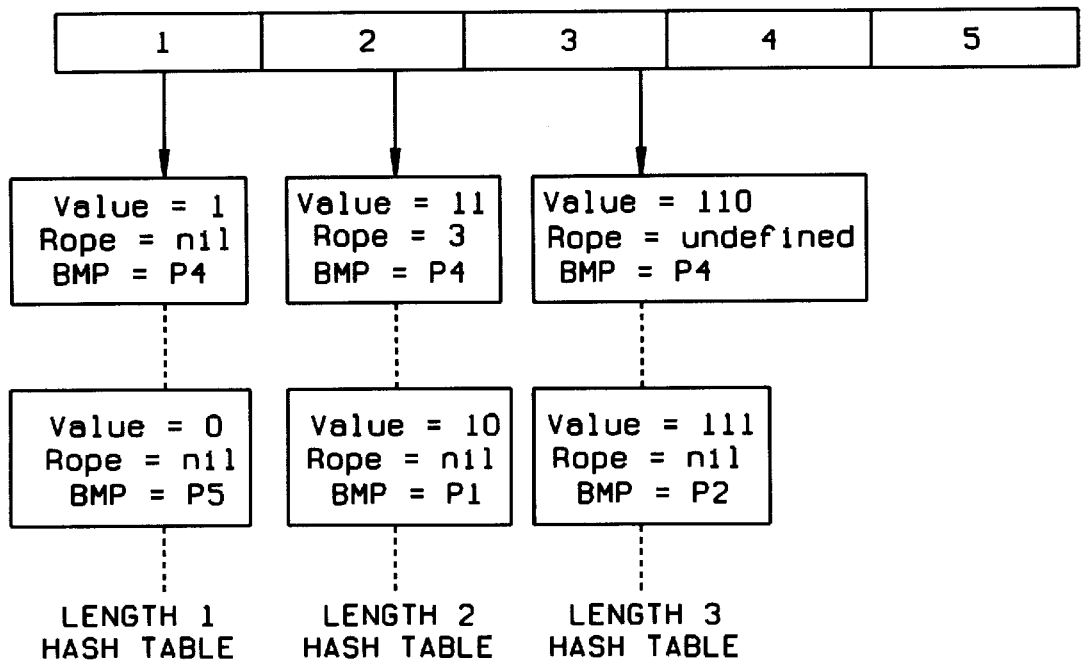
FIG. 28 is a diagram similar to FIGS. 26 and 27 illustrating the Hash Table after processing at level 3.

We then move on and process marker 110. We find its rope using the upper rope and get the wrong value nil. Fortunately, we use the seed bmp value of P4 to overwrite the correct value. Next, since the prefix list associated with P4 is {P5} we recursively process that list, while leaving the Rope of 110 undefined. At this point our hash table is shown in FIG. 28.

Figure 29:
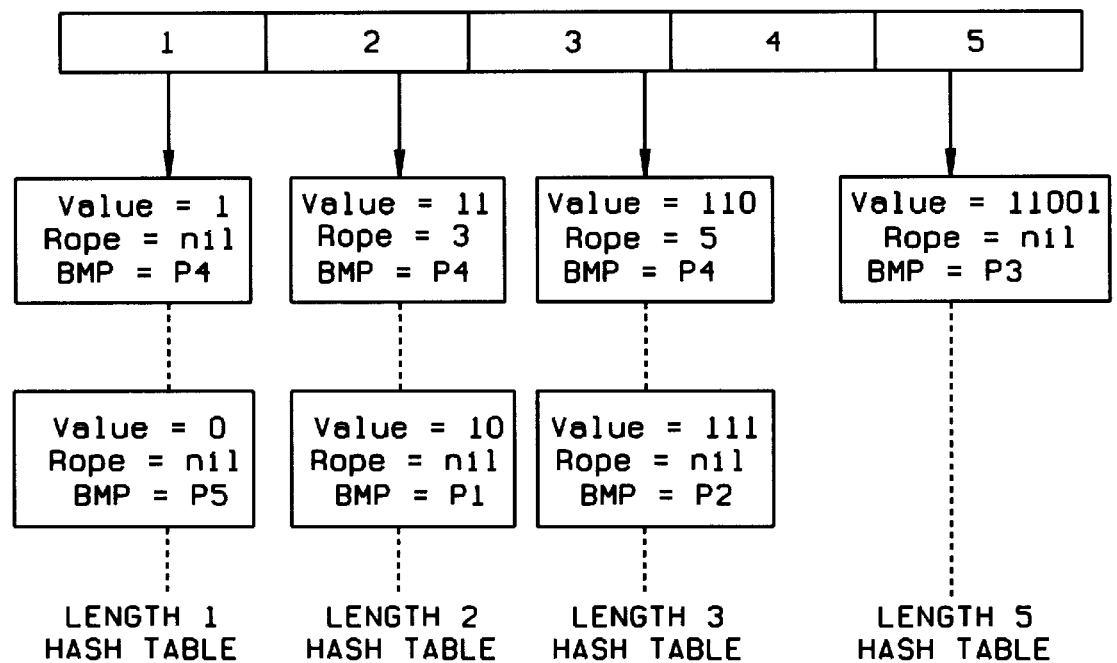
FIG. 29 is a diagram similar to the diagram shown in the prior three figures illustrating the final hash database.

Finally, we recursively process the prefix containing P5. At this state, we fill in the Rope of 110 to be 5 and we finish processing the only marker in the usual way. The result is the final database of FIG. 29!

Here is a rope search example. Consider the database shown in FIG. 29 and consider a search for the address whose five bits are 11000. We will start with the initial Rope of 2, 1 and find a match in the Length 2 Hash Table. This gives us a new Rope of 3 but we also update bmp=P4. We then search for the first 3 bits of the address and find a match in the Length 3 Hash Table. This gives us a new Rope of 5 but we also update bmp=P4. We proceed to 5 and fail to find a match for 11000. At this point our Rope is nil, and so we terminate with bmp=P4.

If we try and calculate complexity by writing down recursive equations the result is rather difficult to disentangle. Simpler by far is to unfold the recursion completely and make the following observations:

Since each prefix list called in the recursion contains at most half the lengths of the original prefix, each prefix can be examined at most log W times in routines like ComputePrefixLengths and the For loop in which we add markers for each prefix in the list. This contributes $N\log_2 W$.

We do a rope search for each marker which contributes log W for each marker which leads to total of $O(N \log^2 W)$.

Making a rope from a set of lengths is potentially O(W), which would lead to potentially W for N log W markers which would lead to NW log W. A clever trick to avoid this is described below which reduces rope computation to logW which still leaves us with $O(N \log^2 W)$.

One helpful way to prove the fact that each prefix list is examined once is to give a recursive label to each call to RecursiveHashBuild. The first call is labeled 1. The label of call i within parent call (with label X) is label X.i. Thus the recursive labels 1.2.1 is the first call made within the second call made within the original call to RecursiveHashBuild. Let the level i component of a label X be the i-the component in the label. It is easy to prove that a label does not have more than log W levels. It is also easy to prove (by induction) that a given prefix is examined at most once in any level. This gives the desired result.

That is why the time complexity is $O(N \log^2 W)$. In terms of storage complexity, we need to store each prefix in a list. Fortunately, we partition the list into sublists and we do not need to keep storage for the original lists. Thus we need list storage for each prefix and also for each marker, which is the minimum needed! Thus the storage complexity is N log W.

Suppose we process a prefix list to find the set of lengths and want to make a Rope. How can the Rope making process take less than W time? If Rope processing takes W time we are doomed because we have to make one Rope for each marker which would lead to a complexity of NW log W.

This is why we insisted that the initial list of prefixes be sorted by prefix lengths. This is easy to do because we can do bucket sort on the W possible lengths which costs O(N+W). Once the initial prefix list is sorted, we make the simple observation: when our RecursiveHashBuild routines partitions lists, it maintains the same order as in the original list. In other words, if the initial list is sorted all the partitioned lists remain sorted.

Once the list of prefixes is sorted (say in increasing order of lengths) the routine ComputePrefixLengths is quite simple. It builds an array Lengths such that Length[i] is the i-th largest prefix length among prefixes ComputePrefixLengths. This can be used by the MakeRope function (see earlier code) to make rope in log W time.

We now describe two more optimizations that can be added to all the schemes described earlier. So far we have assumed (see FIG. 12 and code in FIG. 18) that we always start by searching at the median level in a subtrie. However, there are cases when we may want to pick other levels as the starting probe leading to asymmetric binary search. This can be of use when certain length prefixes are more commonly encountered; by starting with these levels, we can improve the worst case. For example, we could easily modify the code in FIG. 18 by picking some other level besides the median based on some weighting function.

It can also be in combination with Rope Search to improve the worst case time. Suppose we have a database of 6 prefix lengths with prefixes 0*, 01*, 010*, 1000*, 00110*, and 110000*.

If we start at Length 2, and the answer is one of the last four prefixes, RopeSearch will take only 1 more probe because there is only 1 prefix in each subtrie at Length 2. Thus in 2 probes, we can find the best matching prefix instead of the $[\log_2 (6+1)=3$ predicted by the median based solution. Note that the standard median based solution would start at Level 3 or 4 and on failure would required two more probes.

Thus we can speed up the worst case by picking the splitting level to sometimes be lower than the median (if the search times in the subtries below the median are sufficiently low). It is easy to compute the optimal splitting levels to improve the worst case by using a dynamic programming technique.

In Rope Search, in particular, since we do not know in advance how many markers there are at each length, if we use hashing for exact matching, it is hard to size the hash tables in advance.

The following is a simple idea for finessing the hash table problem: use one hash table instead of multiple hash tables. We can do so as long as every prefix of a prefix corresponds to a unique entry in the single hash table. We can do so by padding prefixes with a special character (e.g., so that 01* can differ from 010* and 011*) or by using a length field. We pad each prefix to length W by adding 0's and then we prefix with a length field that tells us the actual length of the prefix. For example, for W=4 we would encode encode 01* as 2 (its length) concatenated with 0100 (padded prefix): the result would take 6 bits (100100). Consider the marker corresponding to 01* which is 0*. We encode it as 010000.

This scheme has 3 advantages:
. It allows us to avoid dynamically sizing the hash table because we have to allocate memory for one has table with N log W entries only!

It allows us to share the extra hash table memory (required to avoid collisions) among all tables which should improve the collision rate.

It allows us (if we want to do perfect hashing) to pick just one perfect hash rather than one per length.

Another way to handle this is to use separate hash tables but to do amortized dynamic hash table insertion (whenever a hash table is full, allocate a double sized Hash Table, copy out into new table). The cost of reallocating hash tables now gets nicely amortized and we only pay a factor of 2 extra in hash size (much less crucial than other storage).

So far we have not determined the exact matching scheme used in each length table. The best possibility for software is hashing. The best possibility for hardware is to use CAMs. In some cases, we can also use arrays (e.g., in place of a 16 bit hash) if the memory is available.

Finally, we can combine our scheme described here with an earlier scheme described in the related patent application referenced above. The idea there is to expand prefixes in order to reduce the Levels. For example, if we take a prefix like 1* of Length 1, we can replace it by two equivalent prefixes 10* and 11* of Length 2. By careful use of expansion we can reduce the number of distinct prefix lengths in many practical Ipv4 database from say 32 to 3 (e.g., 18, 24, 32 in one example) with only a small expansion in memory (we pick the levels carefully using a dynamic programming based algorithm to optimized marker storage) of a factor of 2–3. This effectively reduces the worst case of binary search on levels to 2 hashes, of which one can be memory access.

The foregoing description of the invention has been provided to illustrate the best mode and variance thereof to facilitate one of ordinary skill in the art gaining and understanding to enable him to make and use the invention. However, the foregoing disclosure should not be considered as limiting and instead merely as exemplary. Instead, the invention shall be considered as limited only by the scope of the claims appended hereto and their equivalents.

What is claimed is:

1. A method of routing data packets through an electronic routing device, said data packets having an address indicative of a desired destination, and said routing device having a database of prefix entries arranged in multiple sub-databases each of which contains entries corresponding to prefixes having the same length, each of said entries corresponding to a desired output data link, said method comprising the steps of:
   a) reading the destination address of a data packet desired to be routed,
   searching for a matching entry in the sub-database corresponding to the median prefix length of the set of all available prefix lengths,
   c) if no match is found, then searching in the sub-database corresponding as nearly as possible to the median prefix length of the sub-databases of prefix length strictly less than the sub-database just searched and strictly more than any previously searched sub-database,
   d) if a match is found, then searching in the sub-database corresponding as nearly as possible to the median prefix length of the sub-databases of prefix length strictly more than the sub-database just searched and strictly less than any previously searched sub-database,
   e) repeating steps b) and c) until there are no more sub-databases to search, and
   f) routing the data packet to an output data link corresponding to said matched prefix entry contained in said database.

2. The method of claim 1 further comprising the steps of:
   a) assigning a default output data link at the beginning of each search, and
   b) substituting a new best output data link corresponding to a matching entry for any previously assigned output data link upon making a match.

3. The method of claim 2 wherein any sub-database may include marker entries corresponding to prefix entries in a longer prefix length sub-database, and wherein any sub-database prefix entry may also be a marker, and further comprising the step of assigning as a final output data link that output data link which corresponds to any matching prefix only.

4. The method of claim 3 wherein the step of assigning a final output data link upon making a prefix only match includes the step of terminating the search.

5. The method of claim 3 wherein each marker includes a set of desired sub-databases for the next search step, said set including only those sub-databases that contain an entry that is an extension of said marker, and wherein the next search step includes searching as before said set of desired sub-databases for a matching entry.

6. The method of claim 5 wherein said set of desired sub-databases includes only the median sub-databases corresponding to additional searching steps, and wherein all further search steps include searching as before only in said desired sub-databases.

7. The method of claim 5 wherein said desired sub-databases include only those sub-databases that should be searched when no matches are found at each successive level of the multi-step prefix length binary search.

8. A router for data packets including a plurality of input data links for receiving incoming data packets, a plurality of output data links for dispatching outgoing data packets, an adjustable switch interconnected between said input data links and said output data links for adjustably connecting a selected one of said input data links to a selected one of said output data links, a data processor connected to said switch and having means for controlling said switch, and said data processor having a database of prefix entries which comprises multiple sub-databases each of which contains entries corresponding to prefixes having the same length, each of said entries having associated with it a desired output data link for routing of an incoming data packet, means for accessing said database for matching of a destination address of an incoming data packet with an entry, and means for adjusting said switch in response to a matching entry in said database to thereby route a data packet appearing at an input data link to a corresponding output data link, said accessing means including means for matching a destination address of an incoming data packet with a prefix entry using a multi-step prefix length binary search algorithm that includes the steps of:
   a) searching for a matching entry in the sub-database corresponding to the median prefix length of the set of all available prefix lengths,
   b) if no match is found, then searching in the sub-database corresponding as nearly as possible to the median prefix length of the sub-databases of prefix length strictly less than the sub-database just searched and strictly more than any previously searched sub-database,
   c) if a match is found, then searching in the sub-database corresponding as nearly as possible to the median prefix length of the sub-databases of prefix length strictly more than the sub-database just searched and strictly less than any previously searched sub-database, and
   d) repeating steps b) and c) until there are no more sub-databases to search.

9. The router of claim 8 wherein the multi-step prefix length binary search includes the steps of assigning a default output data link at the beginning of each search, and substituting a new best output data link corresponding to a matching entry for any previously assigned output data link upon making a match.

10. The router of claim 9 wherein any sub-database may include marker entries corresponding to prefix entries in a longer prefix length sub-database, and wherein any sub-database prefix entry may also be a marker entry, and wherein the multi-step prefix length binary search further comprises the step of assigning as a final output data link that output data link which corresponds to any matching prefix only.

11. The router of claim 10 wherein each marker includes a set of desired sub-databases for the next search step, said set including only those sub-databases that contain an entry that is an extension of said marker, and wherein the next search step includes searching as before said set of desired sub-databases for a matching entry.

12. The router of claim 10 wherein said desired sub-databases include only those sub-databases that should be searched when no matches are found at each successive level of the multi-step prefix length binary search.

13. The router of claim 10 wherein said set of desired sub-databases includes only the median sub-databases corresponding to additional searching steps, and wherein all further search steps include searching as before only in said desired sub-databases.

14. A method for creating a database of entries for routing data packets from a plurality of arbitrary prefixes, each of said arbitrary prefixes having an arbitrary length and being indicative of a desired destination, said method comprising the steps of:

a) determining the length of each prefix;
b) assigning an entry corresponding to each prefix to a sub-database according to its prefix length so that the database is comprised of a plurality of sub-databases arranged by prefix length;
c) inserting a marker entry containing the first Y bits of each prefix P corresponding to its associated entry in sub-database Y for each sub-database that would be searched before searching the P sub-database in a multi-step prefix length binary search, where Y is strictly less than P, including adding to each marker entry X an output data link address corresponding to a longest matching prefix of X;
d) adding a prefix-cum-marker entry for each prefix P corresponding to its associated entry in sub-database L together with the associated output data link corresponding to P if there already is a marker entry corresponding to P;
e) adding an indication for each non-marker prefix entry that the added output data link is the ultimate output data link;
f) augmenting each marker entry X with a search field comprised of those sub-databases containing prefixes that are extensions of X, including limiting the search field to only those sub-databases that should be searched when no matches are found at each successive level of the multi-step prefix length binary search, and further including a multi-step procedure initialized with the plurality of prefixes corresponding to the entries to be inserted into the sub-databases and containing successive sub-steps of:

1) computing the sequence of sub-databases that are to be searched when no matches are found when doing a multi-step search in the current plurality of sub-databases,
2) terminating the building procedure if the current plurality is empty,
3) finding the median length M of the current plurality of sub-databases,
4) dividing said plurality of sub-databases into two pluralities, the first containing entries corresponding to all prefixes of length strictly less than M, and the second containing entries corresponding to all prefixes of length greater than M, and further subdividing said second plurality into multiple pluralities such that entries corresponding to prefixes containing the same first M bits is assigned to the same plurality,
5) inserting an entry X into sub-database M for each distinct value X of said first M bits and adding information to X that lists the output data link associated with the longest matching prefix of X, and
6) repeating steps 1) through 5) for each of the subdivided pluralities.

15. The method of claim 14 further comprising the step of arranging the plurality of sub-databases into the architecture of a trie for determining the corresponding longest matching prefix of X.

16. The method of claim 15 in which the longest matching prefix associated with an entry X is determined when X is inserted by doing a multi-step search on the sub-database contents that have been inserted before X is inserted.

* * * * *